United States Patent
Hatano

(10) Patent No.: US 10,613,451 B2
(45) Date of Patent: Apr. 7, 2020

(54) IMAGE FORMING APPARATUS WITH MOVEABLE TRANSFER MEMBERS

(71) Applicant: CANON KABUSHIKI KAISHA, Tokyo (JP)

(72) Inventor: Fukashi Hatano, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/031,334

(22) Filed: Jul. 10, 2018

(65) Prior Publication Data

US 2019/0025726 A1 Jan. 24, 2019

(30) Foreign Application Priority Data

Jul. 18, 2017 (JP) ................... 2017-139450

(51) Int. Cl.
*G03G 15/01* (2006.01)
*G03G 15/16* (2006.01)

(52) U.S. Cl.
CPC ..... *G03G 15/0136* (2013.01); *G03G 15/0189* (2013.01); *G03G 15/1615* (2013.01); *G03G 2215/0193* (2013.01)

(58) Field of Classification Search
CPC ........... G03G 15/0189; G03G 15/0131; G03G 15/0136; G03G 15/1605; G03G 15/1615; G03G 2215/0122; G03G 2215/0193; G03G 2215/0125; G03G 2215/1623
USPC ....................................... 399/302
See application file for complete search history.

(56) References Cited

U.S. PATENT DOCUMENTS

| | | | | |
|---|---|---|---|---|
| 7,751,762 | B2* | 7/2010 | Hatayama | .......... G03G 15/1605 399/299 |
| 8,433,226 | B2* | 4/2013 | Nomura | ............. G03G 15/1615 399/304 |
| 9,026,016 | B2 | 5/2015 | Nakaegawa | |
| 9,557,690 | B2 | 1/2017 | Hatano | |
| 2006/0067746 | A1* | 3/2006 | Okazaki | ............. G03G 21/1647 399/302 |
| 2006/0171748 | A1* | 8/2006 | Inui | .................... G03G 15/0131 399/301 |

(Continued)

FOREIGN PATENT DOCUMENTS

JP    2002-072616 A      3/2002
JP    2003156947 A  *   5/2003

(Continued)

*Primary Examiner* — Robert B Beatty
(74) *Attorney, Agent, or Firm* — Venable LLP

(57) ABSTRACT

An image forming apparatus includes an endless belt; an image bearing member that bears a toner image and contacts with the outer circumferential surface of the belt at a transfer position for transferring the toner image to the belt, the transfer position being disposed downstream; a transfer roller configured to transfer the toner image from the image bearing to the belt and contact with an inner circumferential surface of the belt at a contact position, the contact position not overlapping with the transfer position as viewed from the thickness direction of the belt; a biasing member that biases the transfer roller toward the inner circumferential surface of the belt, and a position of the transfer roller is set to a balanced position between a biasing force by the transfer roller pressing the inner circumferential surface of the belt and the drag received by the transfer roller from the belt.

16 Claims, 18 Drawing Sheets

(56) References Cited

U.S. PATENT DOCUMENTS

| | | | |
|---|---|---|---|
| 2012/0003006 A1* | 1/2012 | Tachiki | G03G 15/161 |
| | | | 399/121 |
| 2012/0251193 A1* | 10/2012 | Ohashi | G03G 15/0136 |
| | | | 399/299 |
| 2016/0274501 A1 | 9/2016 | Torimaru | |
| 2018/0039212 A1* | 2/2018 | Tomine | G03G 15/5054 |

FOREIGN PATENT DOCUMENTS

| | | | | |
|---|---|---|---|---|
| JP | 2005-128079 A | | 5/2005 | |
| JP | 2007219419 A | * | 8/2007 | ......... G03G 15/1605 |
| JP | 2009-075350 A | | 4/2009 | |
| JP | 2009116160 A | * | 5/2009 | |
| JP | 2010002872 A | * | 1/2010 | |
| JP | 2012-108554 A | | 6/2012 | |
| JP | 2013-037203 A | | 2/2013 | |
| JP | 2016-173503 A | | 9/2016 | |

* cited by examiner

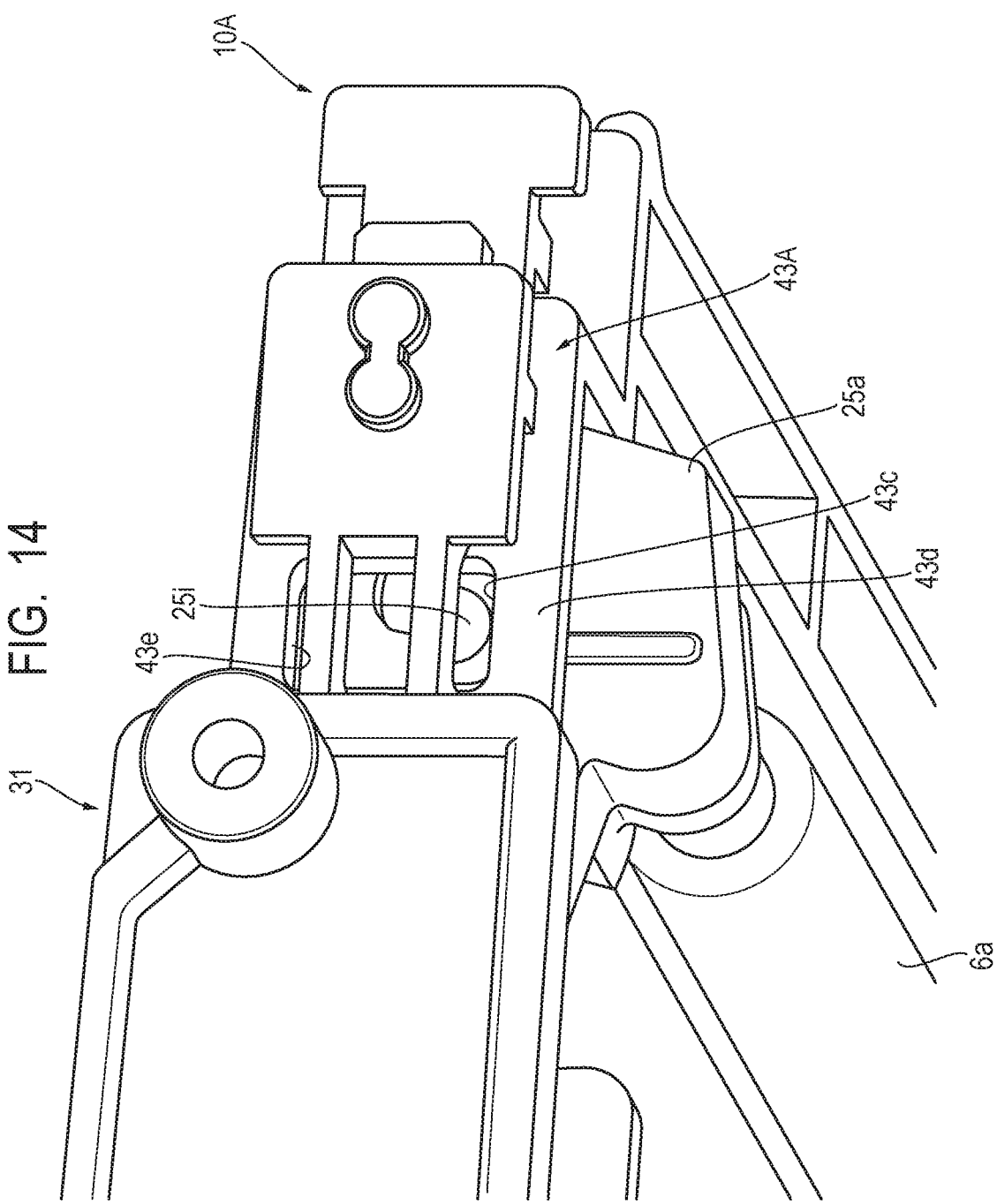

IMAGE FORMING APPARATUS WITH MOVEABLE TRANSFER MEMBERS

BACKGROUND OF THE INVENTION

Field of the Invention

The present invention relates to an image forming apparatus such as a copying machine, a printer, a facsimile machine, and a multifunction peripheral having a plurality of functions.

Description of the Related Art

As an image forming apparatus, there is known a tandem type construction in which a plurality of photosensitive drums is disposed along the rotation direction of an intermediate transfer belt. In the case of this construction, a plurality of transfer rollers transfers toner images from the plurality of photosensitive drums to the intermediate transfer belt. The plurality of transfer rollers is disposed at positions corresponding to the plurality of photosensitive drums on the inner circumferential side of the intermediate transfer belt.

Conventionally, there has been also known a construction of using metal rollers as the plurality of transfer rollers and including a pair of support rollers that is disposed upstream and downstream from the plurality of transfer rollers respectively so as to loop the intermediate transfer belt (for example, Japanese Patent Application Laid-Open No. 2016-173503). Since the pair of the support rollers loops the intermediate transfer belt, a transfer surface (predetermined looped surface) for transferring toner images from the photosensitive drums to the intermediate transfer belt is formed on the outer circumferential surface of the intermediate transfer belt.

In the case where a metal roller is used as the transfer roller, the roller itself has no elasticity. Therefore, when the transfer roller faces the photosensitive drum so as to be only the thickness of the intermediate transfer belt away from the photosensitive drum, there is a possibility that the transfer roller damages the photosensitive drum. Therefore, in the case of the construction described in Japanese Patent Application Laid-Open No. 2016-173503, the transfer roller is disposed so as to be offset from the photosensitive drum to the downstream side in the rotation direction of the intermediate transfer belt. On this occasion, for securing the positional accuracy of the photosensitive drum and the transfer roller, the transfer roller can be biased toward the inner surface of the intermediate transfer belt, and the positioning of the transfer roller can be performed at a position of balancing with the tensile force of the intermediate transfer belt.

Such a positioning construction is influenced by the tensile force of the intermediate transfer belt. Therefore, for example, in the case where the transfer roller on the most upstream side is used as the support roller for forming the transfer surface, the transfer surface cannot be stably formed. For example, in the case where image bearing members for color images are separated from the intermediate transfer belt at the time of forming a monochrome image from the standpoint of the life, the transfer roller on the most upstream side sometimes retreats from the transfer position. In this case, when the position of a support roller looping the belt on the belt-rotation-directional upstream side from the transfer roller on the most upstream side is away from the transfer surface to the side opposite to the image bearing member, the transfer surface cannot be stably formed. Therefore, in the construction described in Japanese Patent Application Laid-Open No. 2016-173503, the support rollers are disposed on the upstream side and downstream side of the plurality of transfer rollers, respectively, so that the transfer surface is formed. However, in the case where the support rollers are disposed on the upstream side and downstream side of the plurality of transfer rollers respectively, the cross-section of a unit including the intermediate transfer belt increases.

SUMMARY OF THE INVENTION

The present invention has an object to provide a construction that enables the transfer surface to be stably formed and that achieves the miniaturization of the cross-section of the unit including the intermediate transfer belt.

An image forming apparatus as an example of the present invention includes: an endless belt that is rotatably provided; a first image bearing member that bears a first toner image and contacts with an outer circumferential surface of the belt at a first transfer position for transferring the first toner image to the belt; a second image bearing member that bears a second toner image and contacts with the outer circumferential surface of the belt at a second transfer position for transferring the second toner image to the belt, the second transfer position being disposed downstream from the first transfer position in a rotation direction of the belt; a first transfer roller configured to transfer the first toner image from the first image bearing to the belt by being applied a first transfer bias and contact with an inner circumferential surface of the belt at a first contact position, the first contact position does not overlap with the first transfer position as viewed from a thickness direction of the belt; a second transfer roller configured to transfer the second toner image from the second image bearing to the belt and contact with an inner circumferential surface of the belt at a second contact position, the second contact position does not overlap with the second transfer position as viewed from the thickness direction of the belt; a downstream support roller configured to support the belt and contact with an inner circumferential surface of the belt at a third contact position, the third contact position being disposed adjacent to and downstream from the second contact position in the rotation direction of the belt; a first abutting portion configured to abut the first transfer roller and configured to position the first transfer roller with respected to the thickness direction of the belt; a second abutting portion configured to abut the downstream support roller and configured to position the downstream support roller with respected to the thickness direction of the belt; a biasing member that biases the second transfer toward the inner circumferential surface of the belt, and wherein a position of the second transfer roller is set to a balanced position between a biasing force by the second transfer roller pressing the inner circumferential surface of the belt and the drag received by the second transfer roller from the belt.

Further features of the present invention will become apparent from the following description of exemplary embodiments with reference to the attached drawings.

BRIEF DESCRIPTION OF THE DRAWINGS

FIG. 14 is a perspective view of a part of a belt unit according to a third embodiment, as viewed from the ITB rail side.

DESCRIPTION OF THE EMBODIMENTS

Figure 1:
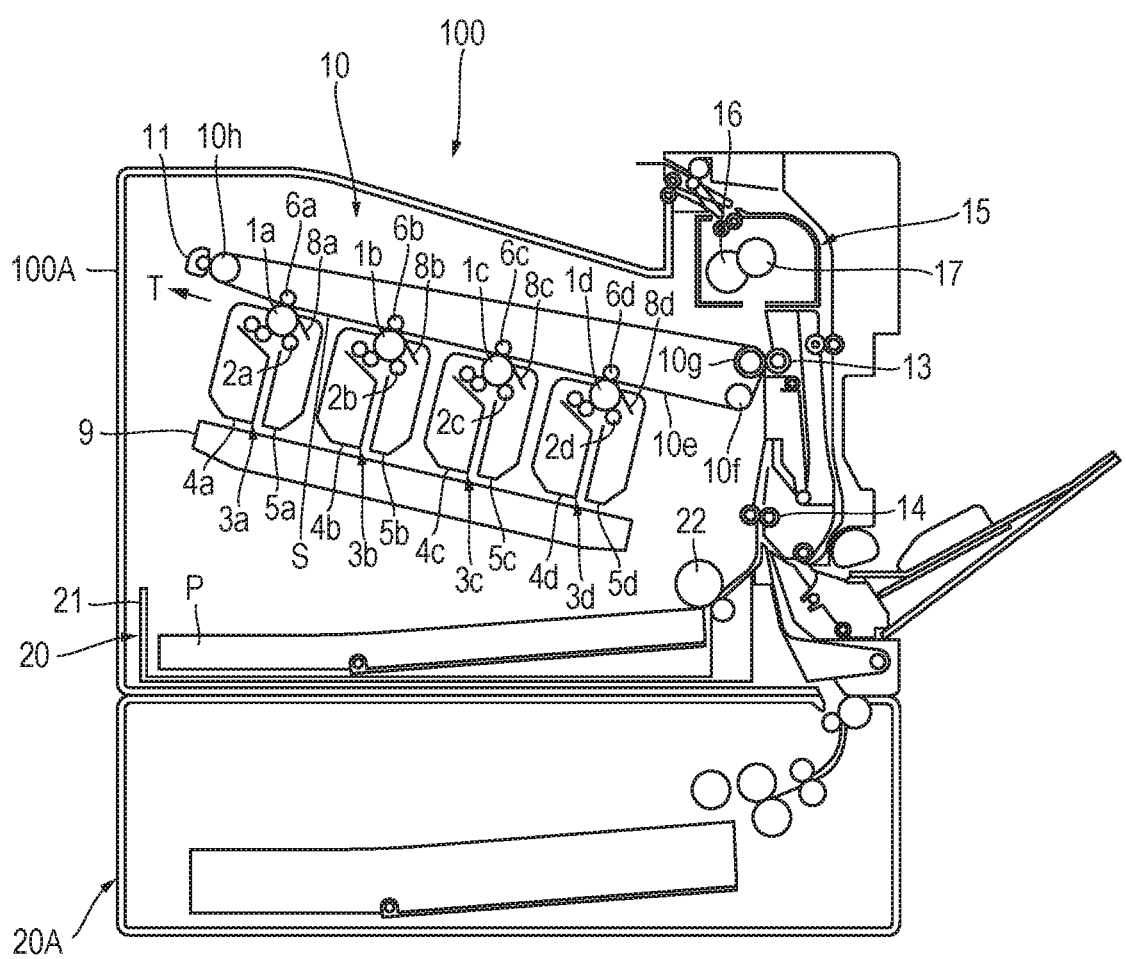
FIG. 1 is a schematic construction cross-section view of an image forming apparatus according to a first embodiment.

Preferred embodiments of the present invention will now be described in detail in accordance with the accompanying drawings.

First Embodiment

A first embodiment will be described using FIG. 1 to FIG. 11. First, a schematic construction of an image forming apparatus in the embodiment will be described using FIG. 1.

[Image Forming Apparatus]

An image forming apparatus 100 is a tandem type laser beam printer that can form a full color image using an electrophotographic process and that employs an intermediate transfer process. The image forming apparatus 100 forms a toner image on a recording material, in response to an image signal from a document reading device (not illustrated) that is connected with a main body 100A. Alternatively, the image forming apparatus 100 forms a toner image on a recording material, in response to an image signal from a host device such as a personal computer that is communicably connected with the main body 100A. As the recording material, there is a sheet material such as a paper sheet, a plastic film and a cloth.

The image forming apparatus 100 in the embodiment includes a first image forming part 3a, a second image forming part 3b, a third image forming part 3c and a fourth image forming part 3d, as a plurality of image forming parts. The image forming parts 3a, 3b, 3c, 3d form images for yellow (Y), magenta (M), cyan (C) and black (K), respectively.

The constructions and operations of the image forming parts 3a, 3b, 3c, 3d are substantially the same, except the color of the toner to be used. Accordingly, the image forming part 3a will be representatively described. The constructions of the other image forming parts are shown by replacing the suffix a put to the reference numeral with suffixes b, c, d, and the descriptions are omitted.

The image forming part 3a includes a photosensitive drum 1a that is a drum type (cylindrical) electrophotographic photosensitive member (photosensitive member), as an image bearing member. In the embodiment, the photosensitive drum 1a corresponds to a first image bearing member, and the photosensitive drums 1b to 1d correspond to a second image bearing member. The photosensitive drum 1a is driven to rotate in a clockwise direction in FIG. 1. Around the photosensitive drum 1a, a charging roller 2a as a charging unit, a developing device 4a as a developing unit, and a drum cleaning device 5a as a clean-up unit are disposed. The charging roller 2a is a roller type charging member. Below the photosensitive drums 1a, 1b, 1c, 1d, an exposure device (in the embodiment, a laser scanner device) 9 as an exposure unit is disposed. Furthermore, a belt unit 10 is disposed above the photosensitive drums 1a, 1b, 1c, 1d.

The belt unit 10 includes an intermediate transfer belt 10e that is an endless belt as an intermediate transfer member, such that the intermediate transfer belt 10e faces the photosensitive drums 1a, 1b, 1c, 1d as the plurality of image bearing members. The intermediate transfer belt 10e is looped around a drive roller 10g, a driven roller 10f and a tension roller 10h as a plurality of support rollers. The intermediate transfer belt 10e rotates in a counterclockwise direction in FIG. 1 (circling movement), when the drive roller 10g is driven to rotate. The tension roller 10h is biased from the inner circumferential surface side to the outer circumferential surface side of the intermediate transfer belt 10*e*, as illustrated by an arrow T in FIG. 1. Thereby, a predetermined tensile force (tension) is applied to the intermediate transfer belt 10*e*.

On the inner circumferential surface side of the intermediate transfer belt 10*e*, primary transfer rollers 6*a*, 6*b*, 6*c*, 6*d* as a plurality of transfer rollers are disposed at positions corresponding to the photosensitive drums 1*a*, 1*b*, 1*c*, 1*d*. The primary transfer rollers 6*a*, 6*b*, 6*c*, 6*d* are respectively biased (pressed) toward the photosensitive drums 1*a*, 1*b*, 1*c*, 1*d* through the intermediate transfer belt 10*e*, at a predetermined pressure. Further, the primary transfer rollers 6*a*, 6*b*, 6*c*, 6*d* form primary transfer parts where the intermediate transfer belt 10*a* and the photosensitive drums 1*a*, 1*b*, 1*c*, 1*d* make contact with each other.

In the embodiment, a part on the outer circumferential surface of the intermediate transfer belt 10*e* is referred to as a predetermined looped surface (transfer surface) S, and the part is a part where the intermediate transfer belt 10*e* is looped between the primary transfer roller 6*a* as the primary transfer roller and the driven roller 10*f* as the support roller. That is, the predetermined looped surface S is formed from the primary transfer roller 6*a* to the driven roller 10*f*, in the rotation direction of the intermediate transfer belt 10*e*. The photosensitive drums 1*a*, 1*b*, 1*c*, 1*d* are disposed in order in the rotation direction of the intermediate transfer belt 10*e*, along the predetermined looped surface S on the outer circumferential side of the intermediate transfer belt 10*e*. The primary transfer rollers 6*a*, 6*b*, 6*c*, 6*d* are respectively disposed at positions corresponding to the photosensitive drums 1*a*, 1*b*, 1*c*, 1*d* on the inner circumferential surface side of the intermediate transfer belt 10*e* in the range of the predetermined looped surface S.

On the outer circumferential surface side of the intermediate transfer belt 10*e*, a secondary transfer roller 13 as a secondary transfer unit is disposed at a position facing the drive roller 10*g*. The secondary transfer roller 13 is a roller type transfer member. The secondary transfer roller 13 is biased (pressed) toward the drive roller 10*g* through the intermediate transfer belt 10*e* at a predetermined pressure, and forms a secondary transfer part where the intermediate transfer belt 10*e* and the secondary transfer roller 13 make contact with each other. On the outer circumferential surface side of the intermediate transfer belt 10*e*, a belt cleaning device 11 is disposed at a position facing the tension roller 10*h*.

In the image forming apparatus 100, a feed device 20 is disposed. The feed device 20 contains a plurality of recording materials P, and feeds the recording material P to the secondary transfer part. In the illustrated example, an external feed device 20A is disposed below the main body 100A. By a user's operation, it is possible to selectively feed any of the recording materials P contained in the feed devices 20, 20A, to the secondary transfer part. A fixing device 15 that fixes the toner image on the recording material P is provided downstream from the secondary transfer part in the conveyance direction of the recording material.

At the time of the image formation, the surface of the photosensitive drum 1*a* that rotates in the clockwise direction is evenly charged by the charging roller 2*a*. Then, the charged surface of the photosensitive drum 1*a* is scanned and exposed by the exposure device 9. Thereby, an electrostatic latent image is formed on the photosensitive drum 1*a*. The electrostatic latent image formed on the photosensitive drum 1*a* is developed as a toner image by the developing device 4*a*, using a toner as a developer. The developing device 4*a* contains a two-component developer containing a non-magnetic toner and a magnetic carrier, as the developer.

The developer may a one-component developer having a toner. In the embodiment, the toner image is formed by a reversal development. In the reversal development, a toner charged to the same polarity as the charge polarity on the photosensitive drum 1*a* (the negative polarity in the embodiment) is attached to an exposure part on the photosensitive drum 1*a*, at which the absolute value of electric potential is decreased because the surface of the photosensitive drum 1*a* is evenly charged and then is exposed.

At the primary transfer part, the toner image formed on the photosensitive drum 1*a* is primarily transferred on the intermediate transfer belt 10*e* that rotates in the counter-clockwise direction. At this time, a primary transfer voltage (primary transfer bias) is applied to the primary transfer roller 6*a*, by a primary transfer power supply (not illustrated) as a voltage applying unit. The primary transfer voltage is a direct-current voltage with the reverse polarity (the positive polarity in the embodiment) of the charge polarity of the toner at the time of development. For example, at the time of the formation of a full color image, toner images formed on the photosensitive drums 1*a*, 1*b*, 1*c*, 1*d* are transferred to the intermediate transfer belt 10*e*, such that the toner images are sequentially superimposed.

At the secondary transfer part, the toner image formed on the intermediate transfer belt 10*e* is secondarily transferred on the recording material P that is conveyed while being sandwiched between the intermediate transfer belt 10*e* and the secondary transfer roller 13. At this time, a secondary transfer voltage (secondary transfer bias) is applied to the secondary transfer roller 13, from a secondary transfer power supply (not illustrated) as a voltage applying unit. The secondary transfer voltage is a direct-current voltage with the reverse polarity (the positive polarity in the embodiment) of the charge polarity of the toner at the time of development. For example, at the time of the formation of a full color image, multiple toner images formed such that the four color toners are superimposed on the intermediate transfer belt 10*e* is conveyed by the intermediate transfer belt 10*e*, is moved to the secondary transfer part, and is collectively transferred on the recording material P at the secondary transfer part.

In the feed device 20, the recording material P is fed from a cassette 21 by a feed roller 22. Thereafter, the recording material P is conveyed to the secondary transfer part by a registration roller 14, in harmony with the timing for the toner image on the intermediate transfer belt 10*e*.

The recording material P after the toner image is transferred is conveyed to the fixing device 15, and is heated and pressurized at a fixing nip zone between a fixing roller 16 and pressurizing roller 17 of the fixing device 15. Thereby, the non-fixed toner image on the surface of the recording material P is fixed on the surface of the recording material P. Thereafter, the recording material P is ejected (output) to the exterior of the image forming apparatus 100.

The toner (primary-transfer remaining toner) remaining on the photosensitive drum 1*a* after the primary transfer is removed from the photosensitive drum 1*a* by the drum cleaning device 5*a*. The drum cleaning device 5*a* sweeps the toner and removes the toner from the surface of the rotating photosensitive drum 1*a*, with a cleaning blade 8*a* as a cleaning member. Further, the toner (secondary-transfer remaining toner) remaining on the intermediate transfer belt 10*e* after the secondary transfer is removed from the intermediate transfer belt 10*e* by the belt cleaning device 11. The belt cleaning device 11 sweeps the toner and removes the toner from the surface of the rotating intermediate transfer belt 10*e*, with one of a fur brash and a cleaning blade as a cleaning member. The removed toner is collected in a collected toner container (not illustrated) through a collected toner conveyance path (not illustrated).

[Primary Transfer Roller]

Next, the primary transfer rollers 6a to 6d will be described in detail. The primary transfer rollers 6a to 6d are provided on the inside of the intermediate transfer belt 10e, so as to face the photosensitive drums 1a to 1d, respectively. For example, each of the primary transfer rollers 6a to 6d is formed of a metal roller whose material is one of SUM (sulfur and sulfur composite free cutting steel) and SUS (stainless steel). In the embodiment, each surface of the primary transfer rollers 6a to 6d is a metal surface. Each of the primary transfer rollers 6a to 6d has a shape that is straight in the thrust direction (rotation axis direction), and the roller diameter is about 6 to 10 mm. Other than the roller whose surface is a metal surface, the metal roller for the primary transfer rollers 6a to 6d may be a roller having a thin rubber layer or coat layer with a thickness of 0.2 mm or less, for example.

[Belt Unit]

Next, the belt unit 10 will be described in detail, using FIG. 2 to FIG. 5, with reference to FIG. 1. For the image forming apparatus 100 and elements of the image forming apparatus 100, the near side with respect to the paper plane of FIG. 1 is referred to as the "front side", which is the side of the operation by the user, and the back side with respect to the paper plane of FIG. 1 is referred to as the "rear side". On the front side of the main body 100A, an unillustrated operation part is provided. The direction of the depth between the front side and the rear side is roughly parallel to the rotation axis direction of the photosensitive drums 1a to 1d and the rollers 10g, 10f, 10h around which the intermediate transfer belt 10e is looped. For the belt unit 10 and elements of the belt unit 10, a direction corresponding to a width direction (a direction roughly orthogonal to the conveyance direction) of the intermediate transfer belt 10e is also referred to as a "thrust direction". In the embodiment, the belt unit 10 is adapted to be detachable from the main body 100A.

Figure 2:
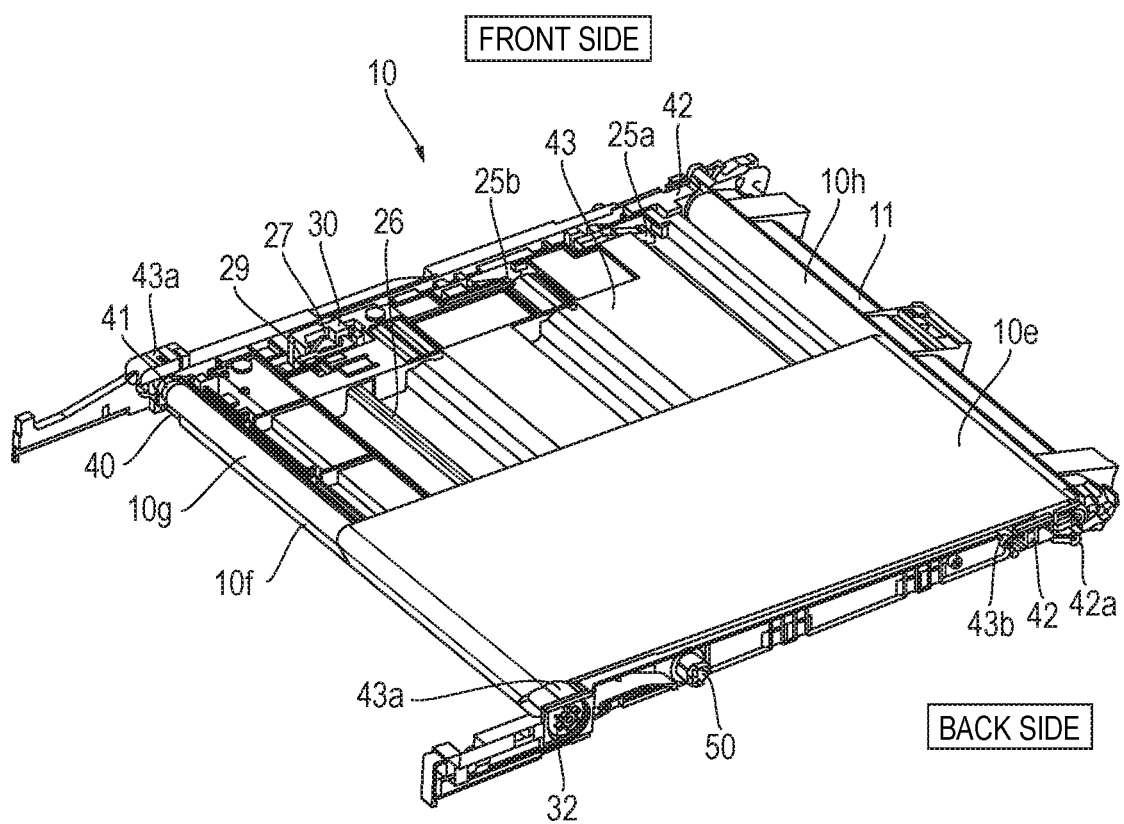
FIG. 2 is a perspective view of a belt unit according to the first embodiment, while a part of an intermediate transfer belt is cut away.

FIG. 2 is a perspective view of the belt unit 10. FIG. 2 illustrates the belt unit 10 while a part of the front side of the intermediate transfer belt 10e is cut away. The belt unit 10 includes the intermediate transfer belt 10e, the primary transfer rollers 6a to 6d, the drive roller 10g, the driven roller 10f, the tension roller 10h and a frame 43 as a holding member. The intermediate transfer belt 10e is looped around the drive roller 10g, the driven roller 10f and the tension roller 10h. The drive roller 10g, the driven roller 10f, the tension roller 10h and the primary transfer rollers 6a to 6d are held by the frame 43.

The drive roller 10g is rotatably supported on both end sides in the longitudinal direction (rotation axis direction), by drive roller bearing members 41 (FIG. 2 illustrates only the front side). The drive roller bearing members 41 is attached to the frame 43. The drive roller 10g rotates when drive is transmitted from a motor (not illustrated) as a drive unit through a drive coupling 32. The intermediate transfer belt 10e is conveyed when the drive roller 10g is driven to rotate. The surface of the drive roller 10g is formed of a rubber layer having a high friction coefficient, for conveying the intermediate transfer belt 10e with no slippage.

The driven roller 10f is rotatably supported on both end sides in the longitudinal direction (rotation axis direction), by driven roller bearing members 40 (FIG. 2 illustrates only the front side). The driven roller bearing members 40 are rockably attached to the frame 43. The driven roller 10f rotates following the intermediate transfer belt 10e.

The tension roller 10h is rotatably supported on both end sides in the longitudinal direction (rotation axis direction), by tension roller bearing members 42 (third support member). The tension roller bearing members 42 are attached to the frame 43, so as to be movable (slidable) in the pressurization direction of the intermediate transfer belt 10e and be rockable. Each of the tension roller bearing members 42 is biased by the compression force of a tension spring (not illustrated) constructed by a compression spring as a biasing unit. Further, each of the tension roller bearing members 42 is moved (slid) from the inner circumferential surface side to the outer circumferential surface side of the intermediate transfer belt 10e, along the biasing direction of the tension spring. Thereby, the tension roller 10h biases the intermediate transfer belt 10e from the inner circumferential surface side to the outer circumferential surface side of the intermediate transfer belt 10e, and gives tensile force to the intermediate transfer belt 10e.

The tension roller 10h is disposed upstream from the primary transfer roller 6a in the rotation direction. The primary transfer roller 6a is disposed on the most upstream side in the rotation direction of the intermediate transfer belt 10e, on the predetermined looped surface S. In the embodiment, since the tension roller 10h is disposed at this position, the intermediate transfer belt 10e is prevented from loosening. That is, in the embodiment, the circumferential speed of the intermediate transfer belt 10e is slightly higher than the circumferential speed of the photosensitive drums 1a to 1d. Therefore, the intermediate transfer belt 10e between the primary transfer roller 6d on the most downstream side and the drive roller 10g is in a tensile state. In the case where there is no tension roller 10h, the intermediate transfer belt 10e between the drive roller 10g and the primary transfer roller 6a on the most upstream side is in a loosening state. The loosening of the intermediate transfer belt 10e decreases the positional accuracy of the pressure-regulated primary transfer roller. Therefore, the tension roller 10h is disposed on the upstream side of the primary transfer roller 6a in the rotation direction of the intermediate transfer belt 10e, so that the intermediate transfer belt 10e is prevented from loosening.

The tension roller 10h is disposed such that the part on the outer circumferential surface of the intermediate transfer belt 10e that is looped around the tension roller 10h is more distant from the photosensitive drums 1a to 1d in the direction orthogonal to the predetermined looped surface S than the predetermined looped surface S is. That is, the tension roller 10h is disposed at a position away from a line to the side opposite to the photosensitive drum 1a. The line is a line that is of external common tangents of the primary transfer roller 6a and the driven roller 10f of the support roller and that is disposed on the side of the intermediate transfer belt 10e. That is, the intermediate transfer belt 10e is looped around the primary transfer roller 6a such that the predetermined support surface S is formed. Further, as illustrated in FIG. 3, a part on the upstream side of the part of the intermediate transfer belt 10e that is looped around the primary transfer roller 6a is looped around the tension roller 10h, above the predetermined looped surface S.

Figure 3:
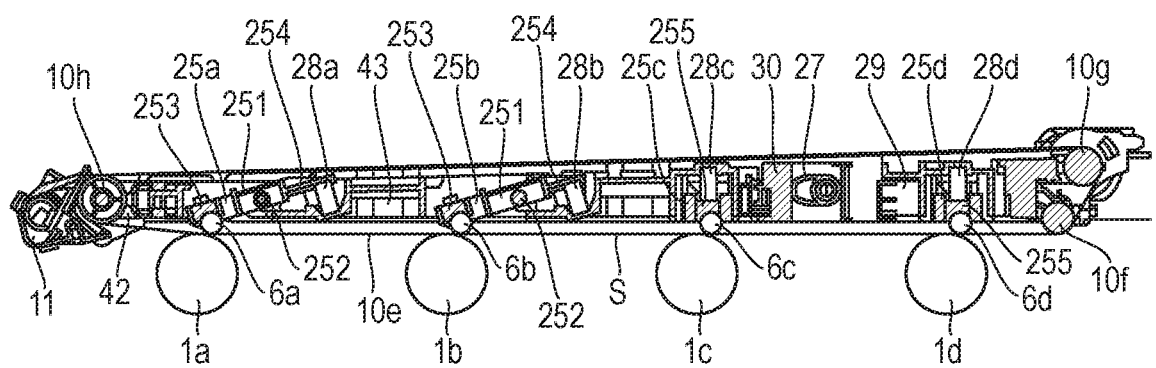
FIG. 3 is a cross-section view of the belt unit according to the first embodiment.

As illustrated in FIG. 3, the primary transfer rollers 6a, 6b are respectively supported about axes on both end sides in the longitudinal direction (rotation axis direction), by primary transfer holders 25a, 25b (first and second support members) supported by the frame 43 so as to be able to pivot. Further, the primary transfer rollers 6c, 6d are respectively supported about axes on both end sides in the longitudinal direction (rotation axis direction), by primary transfer holders 25c, 25d supported by the frame 43 so as to be able to linearly move. The primary transfer rollers 6a, 6b, 6c, 6d are respectively supported by the primary transfer holders 25a, 25b, 25c, 25d, so as to be movable toward the inner circumferential surface side of the intermediate transfer belt 10e. The primary transfer rollers 6a to 6d only needs to be supported so as to be movable toward the inner circumferential surface side of the intermediate transfer belt 10e. The support construction of the primary transfer rollers 6a to 6d may be a pivoting support or may be a linearly-moving support. Further, all may have an identical support construction, or some may have a different support construction.

Figure 7A:
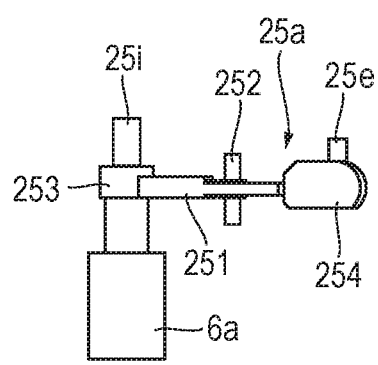
FIG. 7A is a plan view of a construction in which the primary transfer roller is supported so as to be able to pivot.

The primary transfer holder 25a includes an arm part 251, a pivoting shaft 252, a bearing part 253, a spring receiving part 254, a butting part 25i and a projection part 25e (see FIG. 7A). The arm part 251 is provided on the frame 43 through the pivoting shaft 252, and is supported so as to be able to pivot. On one end side of the arm part 251, the bearing part 253 that rotatably supports the primary transfer roller 6a is provided, and on the other side, the spring receiving part 254 is provided. Between the spring receiving part 254 and the frame 43, a pressurizing spring 28a as a first biasing member is provided. The pivoting shaft 252 is provided parallel to the rotation axis direction of the primary transfer roller 6a. The arm part 251 pivots about the pivoting shaft 252, and thereby, the primary transfer roller 6a supported by the bearing part 253 of the arm part 251 can move in a direction of approaching the photosensitive drum 1a or in a direction of departing from the photosensitive drum 1a. Further, the spring receiving part 254 is biased by the pressurizing spring 28a, and thereby, the primary transfer roller 6a supported by the bearing part 253 of the arm part 251 is biased toward the inner circumferential surface of the intermediate transfer belt 10e.

The primary transfer holder 25b has the same construction as the primary transfer holder 25a. The primary transfer roller 6b supported by the bearing part 253 of the arm part 251 is biased by a pressurizing spring 28b as a second biasing member, and thereby, is biased toward the inner circumferential surface of the intermediate transfer belt 10e.

The primary transfer holder 25c is supported such that a bearing part 255 that rotatably supports the primary transfer roller 6c can move linearly along the frame 43 in the top-bottom direction in FIG. 3. Accordingly, the primary transfer roller 6c supported by the bearing part 255 can move in a direction of approaching the photosensitive drum 1c or in a direction of departing from the photosensitive drum 1c. Between the bearing part 255 and the frame 43, a pressurizing spring 28c as a second biasing unit is provided. Further, the bearing part 255 is biased by the pressurizing spring 28c, and thereby, the primary transfer roller 6c supported by the bearing part 255 is biased toward the inner circumferential surface of the intermediate transfer belt 10e. The primary transfer holder 25d has the same construction as the primary transfer holder 25c.

Figure 4:
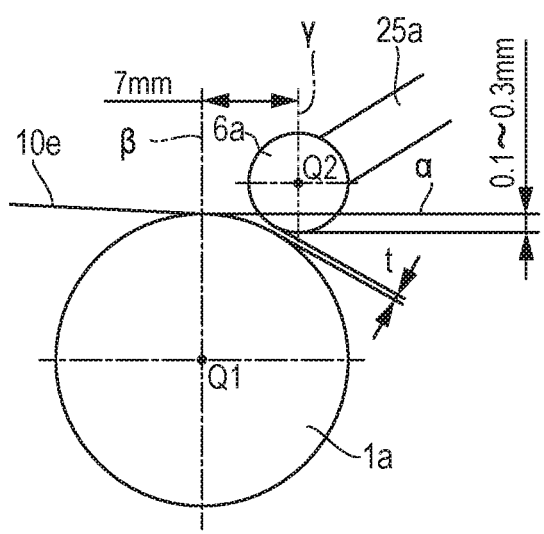
FIG. 4 is a schematic view illustrating a disposition relation between a photosensitive drum and primary transfer roller according to the first embodiment.

The primary transfer rollers 6a to 6d supported by the primary transfer holders 25a to 25d are biased in the directions of the photosensitive drums 1a to 1d by the pressurizing springs 28a to 28d, respectively. As illustrated in FIG. 4, the primary transfer roller 6a is disposed so as to form a contact part that makes contact with the inner circumferential surface of the intermediate transfer belt 10e with a gap t from the photosensitive drum 1a. The gap t is larger than the thickness of the intermediate transfer belt 10e. The pressurizing spring 28a that biases the primary transfer roller 6a is a higher biasing force than the respective pressurizing springs 28b to 28d that bias the primary transfer rollers 6b to 6d. This is because the positioning of the primary transfer roller 6a is not determined by the balance with the tensile force of the belt.

In the embodiment, the primary transfer roller 6a is disposed so as to be offset from the photosensitive drum 1a to the downstream side in the rotation direction of the intermediate transfer belt 10e. Each of the primary transfer rollers 6a to 6d in the embodiment is a metal roller. In the case of using a rigid-body roller such as a metal roller, the roller itself has no elasticity. Therefore, when the primary transfer rollers 6a to 6d face the photosensitive drums 1a to 1d so as to be only the thickness of the intermediate transfer belt 10e away from the photosensitive drums 1a to 1d, there is a possibility that the primary transfer rollers 6a to 6d damage the photosensitive drums 1a to 1d. Accordingly, in the embodiment, the primary transfer rollers 6a to 6d are disposed such that each central axis is shifted with respect to the corresponding central axis of the photosensitive drums 1a to 1d in the downstream side in the rotation direction of the intermediate transfer belt 10e. Thereby, each of the primary transfer rollers 6a to 6d is disposed such that the gap from the corresponding one of the photosensitive drums 1a to 1d is larger than the thickness of the intermediate transfer belt 10e. Further, by utilizing the elasticity of the intermediate transfer belt 10e, it is possible to prevent the primary transfer rollers 6a to 6d from damaging the photosensitive drums 1a to 1d.

Specifically, the primary transfer roller 6a is a metal roller having an outer diameter of 8 mm, and is disposed at a position at which the offset amount of the primary transfer roller 6a from the photosensitive drum 1a is 7 mm. The offset amount is the distance (in a direction along a common tangent plane α of the photosensitive drums 1a to 1d) between a perpendicular β dropped from a central rotation axis Q1 of the photosensitive drum 1a to the tangent plane α and a perpendicular γ dropped from a central rotation axis Q2 of the primary transfer roller 6a to the tangent plane α. In the embodiment, the primary transfer roller 6a is arranged such that the intermediate transfer belt 10e projects by 0.1 to 0.3 mm in a direction roughly perpendicular to the tangent plane from the inner circumferential surface side toward the outer circumferential surface side (in the downward direction in FIG. 4). The same goes for the primary transfer rollers 6b to 6d.

Figure 5:
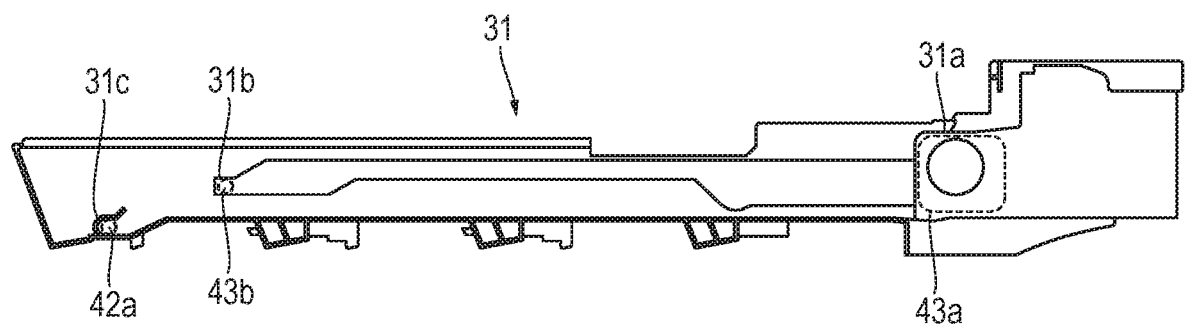
FIG. 5 is a lateral view of an ITB rail according to the first embodiment.

The belt unit 10 is detachable from the main body 100A. Therefore, in the main body 100A, as illustrated in FIG. 5, a rail 31 as a support member is provided. The rail 31 is positioned on a main body frame of the main body 100A. The belt unit 10 is attached or detached along the rail 31. The positioning of the belt unit 10 on the main body 100A is performed on the rail 31 positioned on the main body frame.

Specifically, the rail 31 is provided with a butting part 31a and fitting part 31b for the positioning of the frame 43 and a fitting part 31c for the positioning of the tension roller bearing member 42. The rail 31 is disposed on each of both sides in the width direction of the belt unit 10. As illustrated in FIG. 2, on each of both sides of the belt unit 10 in the width direction of the frame 43, a positioning part 43a and a positioning projection part 43b are provided. Each of the tension roller bearing members 42 that support both ends of the tension roller 10h is provided with a positioning projection part 42a. When the belt unit 10 is attached, the positioning parts 43a provided on the frame 43 butts against the butting part 31a, and the positioning projection parts 43b, 42a are fitted into the fitting parts 31b, 31c, respectively.

That is, the frame 43 is supported by the rail 31. Thereby, the positioning of the belt unit 10 is performed on the rail 31.

The positioning of the rail 31 is performed on the main body frame, and the positioning of the respective image forming parts 3a to 3d including the photosensitive drums 1a to 1d is also performed on the main body frame. Therefore, the positional relation between the belt unit 10 and the image forming parts 3a to 3d is accurately secured.

[Contacting Mechanism]

The image forming apparatus 100 in the embodiment can form a black monochromatic image. Therefore, the intermediate transfer belt 10e can abut on only the photosensitive drum 1d, and can separate from the photosensitive drums 1a to 1 c. When the belt unit 10 is attached or detached, the intermediate transfer belt 10e can separate from the photosensitive drums 1a to 1d, for suppressing the damage of the photosensitive drums 1a to 1d and the intermediate transfer belt 10e.

The image forming apparatus 100 includes a contacting mechanism 270 for making the intermediate transfer belt 10e abut on or separate from the photosensitive drums 1a to 1d. The contacting mechanism 270 makes the intermediate transfer belt 10e abut on or separate from the photosensitive drums 1a to 1d, by moving the primary transfer rollers 6a to 6d and the driven roller 10f between a transfer position and a retreat position.

The contacting mechanism 270 will be described using FIG. 2 and FIG. 6 to FIG. 9C. The contacting mechanism 270 includes a cam 27, a Bk slider 29 and a CL slider 30. As illustrated in FIG. 2, a separation coupling 50 connected with the cam 27 is provided on the rear side of the belt unit 10. The primary transfer roller 6a to 6d and the driven roller 10f move by the rotation of the separation coupling 50. The separation coupling 50 receives drive from an unillustrated motor as a drive source.

Figure 6:
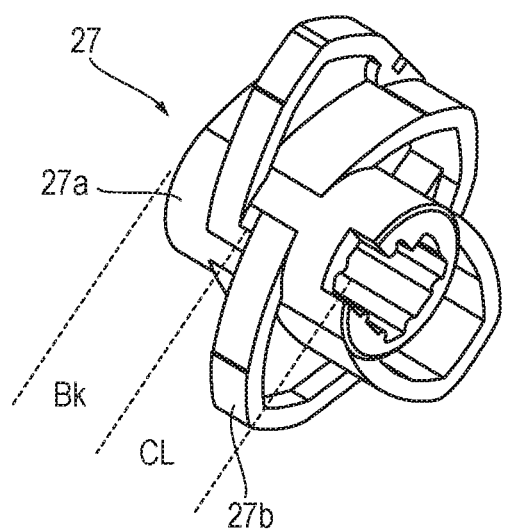
FIG. 6 is a perspective view of a cam of a contacting mechanism according to the first embodiment.

The description will be made more specifically. As illustrated in FIG. 2, the separation coupling 50 is disposed parallel to the primary transfer rollers 6a to 6d and the driven roller 10f, and is connected with a shaft 26 that is rotatably supported by the frame 43. The cam 27 is fixed to each of both ends of the shaft 26. As illustrated in FIG. 6, the cam 27 has a cam shape with four different phases, and includes a first cam part 27a for driving the Bk slider 29 and a second cam part 27b for driving the CL slider 30.

Figure 8A:
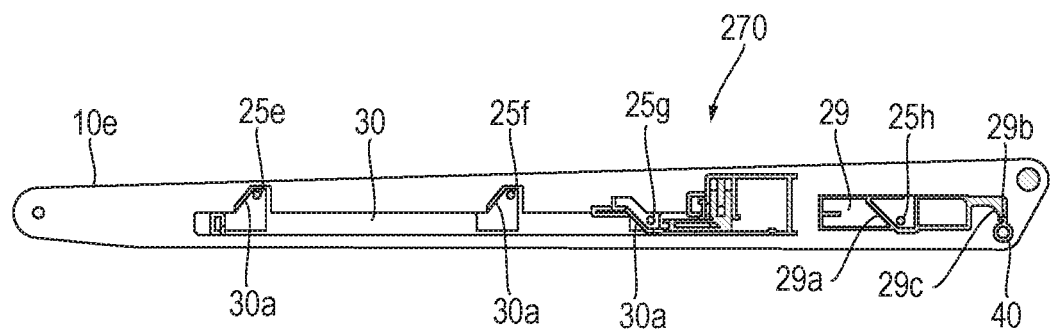
FIG. 8A is a schematic view of the belt unit that illustrates a state where the intermediate transfer belt abuts on all photosensitive drums.
Figure 8B:
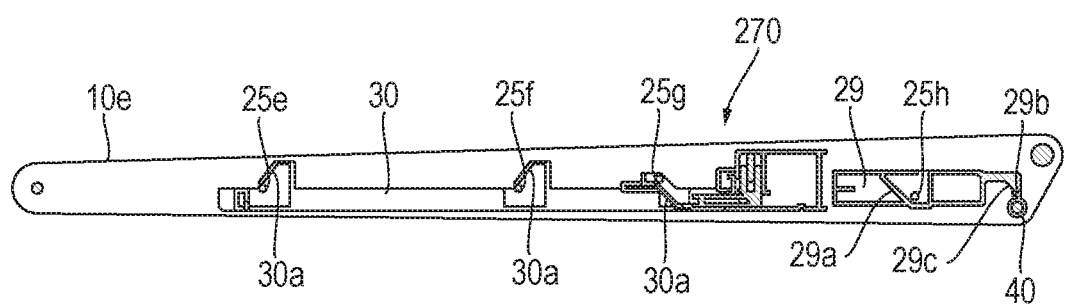
FIG. 8B is a schematic view of the belt unit that illustrates a state where the intermediate transfer belt abuts on only a photosensitive drum for black.
Figure 8C:
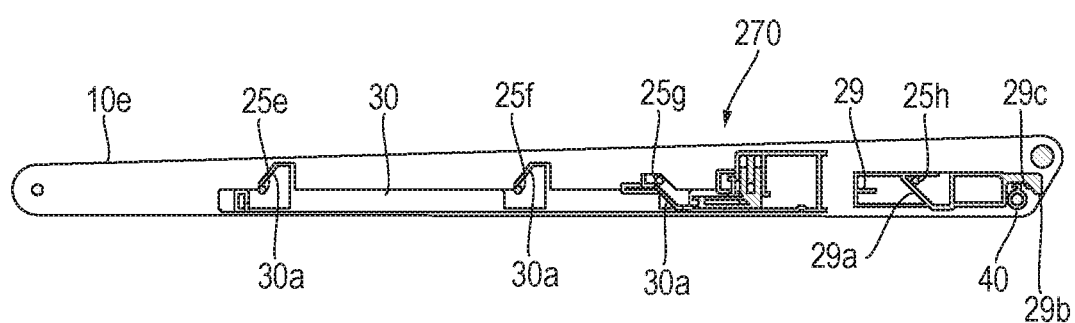
FIG. 8C is a schematic view of the belt unit that illustrates a state where the intermediate transfer belt separates from all photosensitive drums.

The Bk slider 29 and the CL slider 30 are supported by the frame 43, so as to be movable in the longitudinal direction of the frame 43 (in the right-left direction in FIGS. 8A to 8C). The Bk slider 29 and the CL slider 30 are disposed such that the Bk slider 29 engages with the first cam part 27a of the cam 27 and the CL slider 30 engages with the second cam part 27b. The Bk slider 29 and the CL slider 30 each perform predetermined operations by the rotation of the cam 27.

Figure 7B:
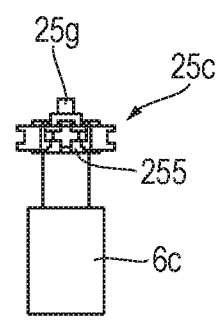
FIG. 7B is a plan view of a construction in which the primary transfer roller is supported so as to be able to linearly move.

As illustrated in FIGS. 7A and 7B and FIGS. 8A to 8C, the primary transfer holders 25a to 25d are provided with projection parts 25e to 25h, respectively. FIG. 7A representatively illustrates the primary transfer holder 25a, but the same goes for the primary transfer holder 25b. FIG. 7B representatively illustrates the primary transfer holder 25c, but the same goes for the primary transfer holder 25d. As illustrated in FIG. 7A, the projection part 25e is provided so as to project from the spring receiving part 254 of the arm part 251 parallel to the rotation axis direction of the primary transfer roller 6a. On the other hand, as illustrated in FIG. 7B, the projection part 25g is provided so as to project from the bearing part 255 parallel to the rotation axis direction of the primary transfer roller 6c.

As illustrated in FIGS. 8A to 8C, the projection parts 25e to 25h are disposed so as to engage with slope parts 29a, 30a respectively provided on the Bk slider 29 and the CL slider 30. The slope part 29a is provided on the Bk slider 29, and engages with the projection part 25h provided on the primary transfer holder 25d. On the CL slider 30, three slope parts 30a are provided, and engage with the projection part 25e of the primary transfer holder 25a, the projection part 25f of the primary transfer holder 25b and the projection part 25g of the primary transfer holder 25c, in the order from the left side in FIG. 8A. The Bk slider 29 includes a butting part 29b and a slope part 29c. The driven roller bearing member 40 supporting the driven roller 10f butts against the butting part 29b. The slope part 29c engages with the driven roller bearing member 40.

When the Bk slider 29 and the CL slider 30 are moved in the right-left direction in FIGS. 8A to 8C, the projection parts 25e to 25h are guided to the slope parts 29a, 30a while being slid. Thereby, the primary transfer holders 25a, 25b pivot and the primary transfer holders 25c, 25d move, so that the primary transfer rollers 6a to 6d move in directions in which the intermediate transfer belt 10e is attached to or detached from the photosensitive drums 1a to 1d.

The driven roller 10f is rotatably supported (about an axis) by the driven roller bearing member 40 rockably supported by the frame 43. By the tensile force of the intermediate transfer belt 10e, the driven roller bearing member 40 is pressurized toward the Bk slider 29 and is pressed onto the butting part 29b of the Bk slider 29, so that the positioning of the driven roller bearing member 40 is performed. That is, for the driven roller 10f as a support roller, the driven roller bearing members 40 as second abutting parts provided at the ends of the driven roller 10f abut on the butting part 29b as a second restriction part (second abutting portion). The position of the butting part 29b has been fixed at least at the time of image formation. Thereby, the movement of the driven roller 10f in the direction of departing from the predetermined looped surface S due to the tensile force of the intermediate transfer belt 10e is restricted. When the Bk slider 29 is moved in the right-left direction in FIGS. 8A to 8C, the driven roller bearing members 40 are guided to the slope part 29c while being slid. Thereby, the driven roller bearing members 40 rock, and the driven roller 10f is attached to or detached from the intermediate transfer belt 10e. The driven roller bearing members 40 slide on the slope part 29c, so that the driven roller 10f moves in the directions in which the intermediate transfer belt 10e is attached to or detached from the photosensitive drums 1a to 1d.

Figure 9A:
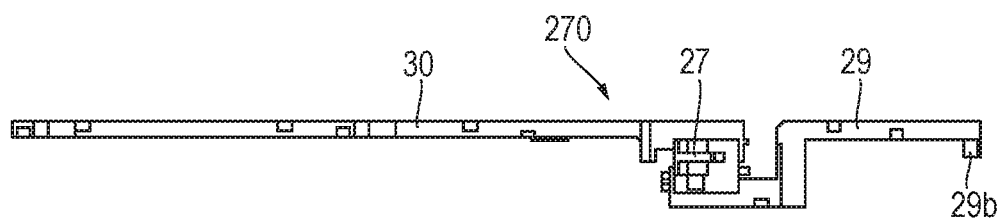
FIG. 9A is a plan view of the contacting mechanism that illustrates a state where the intermediate transfer belt abuts on all photosensitive drums.
Figure 9B:
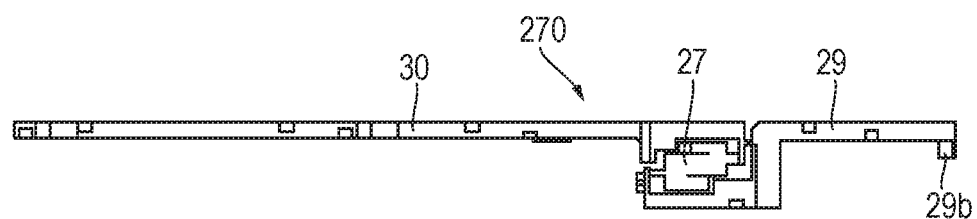
FIG. 9B is a plan view of the contacting mechanism that illustrates a state where the intermediate transfer belt abuts on the photosensitive drum for black.
Figure 9C:
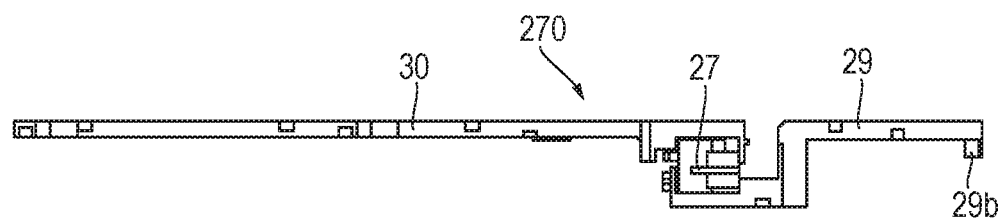
FIG. 9C is a plan view of the contacting mechanism that illustrates a state where the intermediate transfer belt separates from all photosensitive drums.

The contacting mechanism 270 can operate in the following three modes, depending on the rotation stop position of the cam 27. FIG. 8A and FIG. 9A illustrate a full color mode in which the intermediate transfer belt 10e abuts on all photosensitive drums 1a to 1d. FIG. 8B and FIG. 9B illustrate a monochrome mode in which the intermediate transfer belt 10e abuts on only the photosensitive drum 1d. FIG. 8C and FIG. 9C illustrate an all-separation mode in which the intermediate transfer belt 10e separates from all photosensitive drums 1a to 1d.

The cam 27 includes the first cam part 27a for driving the Bk slider 29 and the second cam part 27b for driving the CL slider 30. Further, the operation of the Bk slider 29 and CL slider 30 changes whenever the cam 27 is rotated by 120°. FIGS. 8A to 8C and FIG. 9A to 9C are the states when the cam 27 is rotated on a 120° basis.

Specifically, compared to the positions of the Bk slider 29 and CL slider 30 illustrated in FIG. 8A and FIG. 9A, in the state illustrated in FIG. 8A and FIG. 9A, the position of the Bk slider 29 is not changed, and the CL slider 30 is moved to the right side. Similarly, in the state illustrated in FIG. 8C and FIG. 9C, the Bk slider 29 and the CL slider 30 are moved to the right side. In the embodiment, the operation of the attachment or detachment of the intermediate transfer belt 10e is performed by combining the movement directions of the Bk slider 29 and the CL slider 30, the shapes of the slope parts 29a, 30a and the positional relation of the butting part 29b of the Bk slider 29.

[Positioning Construction of Primary Transfer Roller]

In the case where the primary transfer roller is disposed so as to be offset from the photosensitive drum to the downstream side as illustrated in FIG. 4, a pair of support rollers is disposed on the upstream side and downstream side of the plurality of primary transfer rollers, in conventional constructions. Thereby, the transfer surface (predetermined looped surface) on the intermediate transfer belt to which toner images are transferred from the plurality of photosensitive drums is formed, and the nip pressure between the primary transfer roller and the intermediate transfer belt is kept constant. Further, the condition for balancing the biasing force of the primary transfer roller with the drag generated on the intermediate transfer belt due to the biasing force is set.

In conventional constructions, a pair of support rollers is disposed on the upstream side and downstream side of the plurality of primary transfer rollers. Therefore, the cross-section of the belt unit increases, causing the increase in the size of the apparatus, the increase in the circumferential length of the intermediate transfer belt and the increase in the cost of the support rollers. Accordingly, in the embodiment, the support roller on the upstream side in conventional constructions is excluded. Further, the predetermined looped surface S is formed by the most upstream primary transfer roller 6a of the plurality of primary transfer rollers 6a to 6d and the driven roller 10f, so that the miniaturization of the cross-section of the belt unit 10 is achieved.

The primary transfer roller 6a is disposed so as to be offset from the photosensitive drum 1a to the downstream side. As seen from the cross-section in FIG. 3, for separating the intermediate transfer belt 10e from the photosensitive drums 1a to 1d, the tension roller 10h is disposed such that the outer surface of the tension roller 10h is positioned above the common tangent plane of the photosensitive drums 1a to 1d. Accordingly, the primary transfer roller 6a as a first transfer roller that is disposed on the most upstream side of the plurality of primary transfer rollers is demanded to stably form the predetermined looped surface S, downstream from the tension roller 10h. That is, in the case where the positioning of the primary transfer roller 6a is performed based on the balance between the biasing force of the spring and the tensile force of the intermediate transfer belt 10e, the predetermined looped surface S is not stably formed because of the change in the tensile force of the intermediate transfer belt 10e.

Hence, in the embodiment, with the construction described below, the positioning of the primary transfer roller 6a is performed, and the predetermined looped surface S is stably formed. This point will be described using FIG. 10 and FIG. 11, with reference to FIGS. 7A and 7B. The primary transfer holder 25a of the most upstream primary transfer roller 6a includes a butting part 25i as a movement part (first abutting part) that is disposed coaxially with the primary transfer roller 6a. The butting part 25i is provided on the primary transfer holder 25a, and therefore, moves together with the primary transfer roller 6a.

Figure 10:
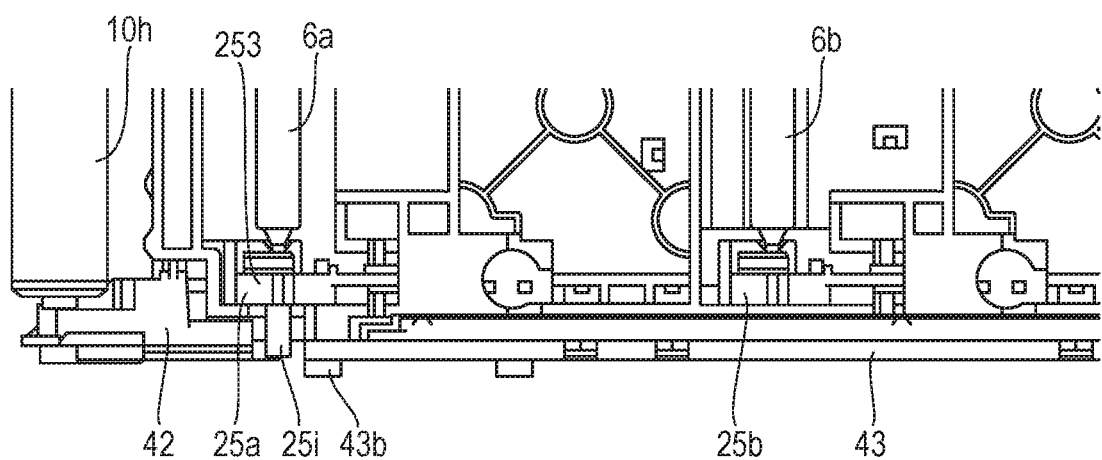
FIG. 10 is a diagram of a part of the belt unit according to the first embodiment, as viewed from the side of the photosensitive drums while the intermediate transfer belt is omitted.

As illustrated in FIG. 7A and FIG. 10, the butting part 25i is provided so as to project to the opposite side of the bearing part 253 supporting the primary transfer roller 6a from the primary transfer roller 6a. That is, the butting part 25i is provided on the outside of the bearing part 253 in the width direction of the intermediate transfer belt 10e. The primary transfer holder 25a is provided on each of both end sides of the primary transfer roller 6a in the longitudinal direction. Therefore, the butting part 25i is provided so as to project from both end sides of the primary transfer roller 6a in the width direction of the intermediate transfer belt 10e. In the embodiment, the butting part 25i is provided such that both sides of the butting part 25i project to further outer sides of the outer ends in the width direction of the intermediate transfer belt 10e, respectively.

The butting part 25i is cylindrically formed such that the outer circumferential surface of the butting part 25i is a cylindrical surface formed coaxially with the primary transfer roller 6a. The outer diameter of the butting part 25i is smaller than the outer diameter of the primary transfer roller 6a. Therefore, the butting part 25i does not abut on the intermediate transfer belt 10e, at least in a state where the primary transfer roller 6a abuts on the intermediate transfer belt 10e. The other primary transfer holders 25b to 25d have no butting part.

Figure 11:
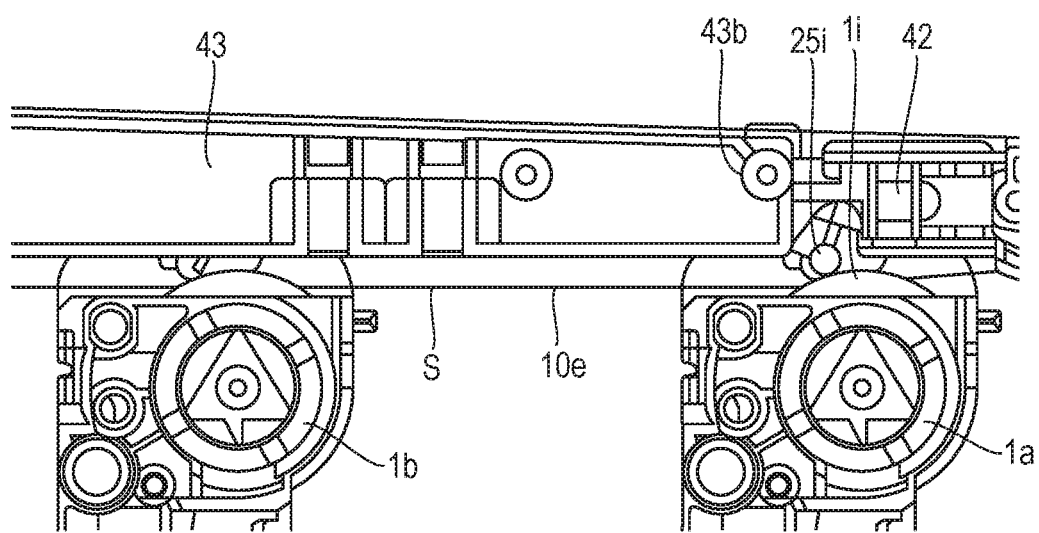
FIG. 11 is a lateral view of a part of the belt unit and a part of an image forming part according to the first embodiment.

As illustrated in FIG. 11, the photosensitive drum 1a (drum unit) bears a yellow toner image in the image forming part 3a on the most upstream side, and is provided with a restriction part 1i as a first restriction part (first abutting portion) that is disposed coaxially with the photosensitive drum 1a. The position of the restriction part 1i has been fixed at least at the time of image formation, and the restriction part 1i is provided at each of both ends of the photosensitive drum 1a, so as to project to the outside of the photosensitive drum 1a in the width direction of the intermediate transfer belt 10e. In the embodiment, the restriction part 1i is provided such that both sides of the restriction part 1i project to further outer sides of the outer ends in the width direction of the intermediate transfer belt 10e, respectively.

The restriction part 1i is formed such that at least a part protrudes from the photosensitive drum 1a to the side of the primary transfer roller 6a. In the embodiment, the restriction part 1i protrudes from the inner circumferential surface of the intermediate transfer belt 10e to the side of the primary transfer roller 6a. Further, the restriction part 1i abuts on the butting part 25i, and restricts the movement of the primary transfer roller 6a, which is biased so as to abut on the inner circumferential surface of the intermediate transfer belt 10e by the pressurizing spring 28a (abutting restriction). The surface of the restriction part 1i on which the butting part 25i abuts is a cylindrical surface formed coaxially with the photosensitive drum 1a. In the embodiment, the restriction part 1i is provided in all image forming parts, for commonalizing the components, but the restriction part 1i may be formed in only the image forming part 3a.

In the embodiment, when the primary transfer roller 6a is pressurized in the direction of the photosensitive drum 1a by the pressurizing spring 28a, the butting part 25i of the primary transfer holder 25a abuts on the restriction part 1i. Thereby, the gap t between the primary transfer roller 6a and the photosensitive drum 1a is secured. That is, the positioning of the primary transfer roller 6a is performed in a state where the movement is restricted by the abutting between the restriction part 1i and the butting part 25i, and the primary transfer roller 6a forms the predetermined looped surface S with the driven roller 10f. The outer circumferential surface of the butting part 25i is cylindrically formed coaxially with the primary transfer roller 6a, and the outer circumferential surface of the restriction part 1i is cylindrically formed coaxially with the photosensitive drum 1a. Therefore, even when the mutual positional relation slightly deviates due to manufacturing error, the butting part 25i and the restriction part 1i can stably abut on each other, and the gap t can be stably formed.

The primary transfer rollers 6b to 6d as second transfer rollers other than the first transfer roller do not include the butting part 25i, unlike the primary transfer roller 6a. Therefore, the positioning of each of the primary transfer roller 6b to 6d is performed such that the tensile force of the intermediate transfer belt 10e and the biasing force of each of the pressurizing springs 28b to 28d balance with each other (pressure restriction). Specifically, each position of the primary transfer rollers 6b to 6d is set to a balanced position between the biasing force by the weight of the roller and the pressurizing springs 28b to 28d and the drag to be generated by the tensile force of the intermediate transfer belt 10e due to the biasing force. That is, the primary transfer rollers 6b to 6d are set to a balanced position between the biasing force (the weight and the biasing force of each of the pressurizing springs 28b to 28d) at which the primary transfer rollers 6b to 6d press the inner circumferential surface of the intermediate transfer belt 10e and the drag received by the primary transfer rollers 6b to 6d from the intermediate transfer belt 10e.

In the embodiment, the pressurizing spring 28a has an appropriate pressurizing force, such that the butting part 25i and the restriction part 1i stably abut on each other. Therefore, the pressurizing spring 28a that bias the primary transfer roller 6a has at least a higher biasing force than the respective pressurizing springs 28b to 28d that bias the primary transfer rollers 6b to 6d. That is, when the pressurizing force of the pressurizing spring 28a is A and each pressurizing force of the other pressurizing springs 28b to 28d is B, the relation of the pressurizing forces satisfies A>B. Here, the pressurizing force of the pressurizing spring 28a is set so as to withstand the drag to be generated by the tensile force of the intermediate transfer belt 10e, and is appropriately set such that the butting part 25i abuts on the restriction part 1i.

As positioning accuracy of the primary transfer roller, the pressure restriction has an advantage over the abutting restriction. Accordingly, the positioning accuracy of the primary transfer roller 6a is slightly lower than the positioning accuracy of the other primary transfer rollers 6b to 6d. However, the primary transfer roller 6a transfers the toner image for yellow, which has less influence on the output image than the other colors. That is, the photosensitive drum 1a disposed at the position corresponding to the primary transfer roller 6a bears the toner image for yellow. Therefore, even when the positioning accuracy is slightly low, the image is less influenced. In the embodiment, the primary transfer rollers 6b to 6d for the other colors employs the pressure restriction, which has a higher positioning accuracy, and the primary transfer roller 6a to transfer the toner image for yellow, which has less influence on the image, employs the abutting restriction. Here, the driven roller 10f also employs the abutting restriction by which the movement is restricted by the abutting between the driven roller bearing member 40 and the butting part 29b.

In the embodiment, the primary transfer roller 6a is the upstream support roller of the upstream and downstream support rollers that form the predetermined looped surface S on the intermediate transfer belt 10e. In other words, the primary transfer roller 6a serves also as the upstream support roller. Therefore, the cross-section of the belt unit 10 can be reduced, resulting in the miniaturization of the apparatus. Thereby, the circumferential length of the intermediate transfer belt can be also reduced, and one support roller can be reduced, resulting in cost reduction.

The positioning of the primary transfer roller 6a is performed by the abutting between the butting part 25i to move together with the primary transfer roller 6a and the restriction part 1i (that is, by the abutting restriction). Thereby, the predetermined looped surface S can be stably formed regardless of the change in the tensile force of the intermediate transfer belt 10e.

In the embodiment, the tension roller 10h is disposed on the upstream side of the primary transfer roller 6a. However, the tension roller sometimes functions also as a steering roller. In the embodiment, the positioning of the primary transfer roller 6a and the driven roller 10f is performed by the abutting restriction. Therefore, the predetermined looped surface S can be stably formed by the primary transfer roller 6a, without being influenced by the operation of the tension roller and steering roller on the upstream side.

In the embodiment, the accuracy of the positioning of the primary transfer roller 6a relative to the photosensitive drum 1a can be increased. That is, the positioning of the primary transfer roller 6a is performed by the butting of the butting part 25i against the restriction part 1i. The butting part 25i is formed integrally with the primary transfer holder 25a that holds the primary transfer roller 6a. The restriction part 1i is formed integrally with the photosensitive drum 1a. Typically, the photosensitive drum 1a is supported through a drum flange by a drum container that contains the photosensitive drum 1a. Accordingly, the positional accuracy of the primary transfer roller 6a and the photosensitive drum 1a is determined by five components: the primary transfer roller 6a, the primary transfer holder 25a (the butting part 25i), the drum container, the drum flange and the photosensitive drum 1a (the restriction part 1i). The positional accuracy of the primary transfer roller 6a and the photosensitive drum 1a is determined by a small number of components, and therefore, the accuracy of the positioning of the primary transfer roller 6a relative to the photosensitive drum 1a can be increased.

Second Embodiment

Figure 12:
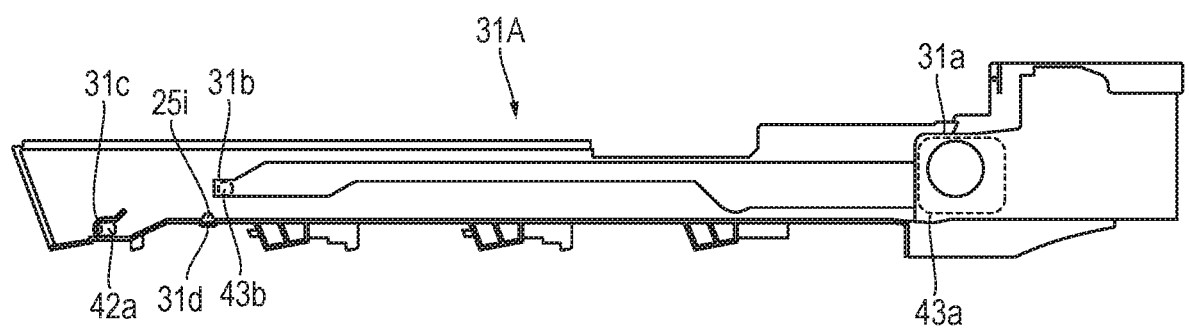
FIG. 12 is a lateral view of an ITB rail according to a second embodiment.
Figure 13:
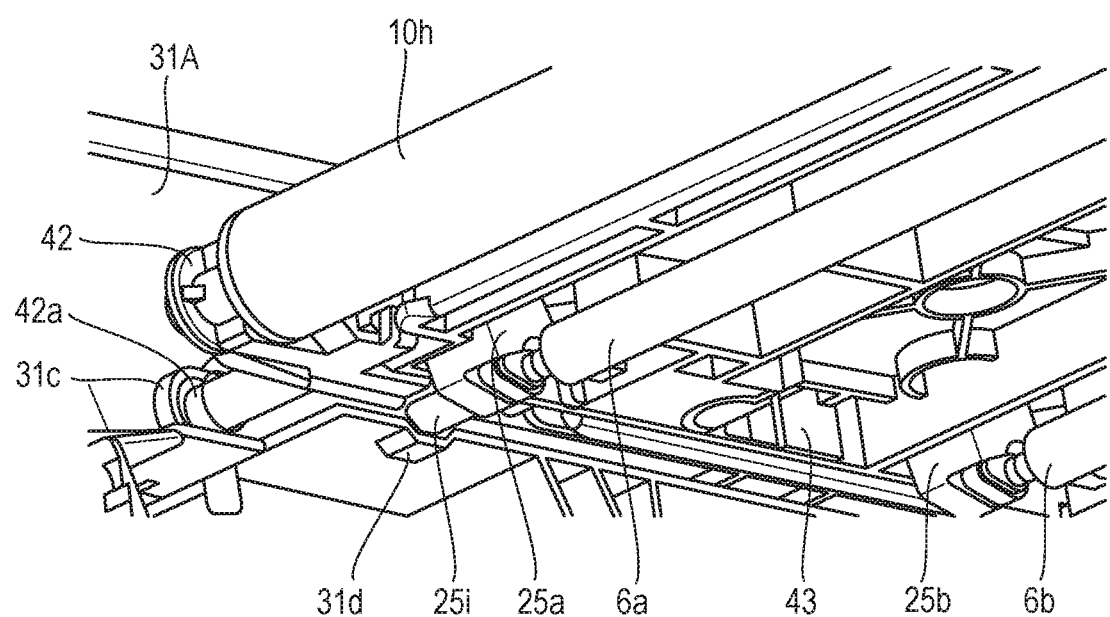
FIG. 13 is a perspective view of a part of the ITB rail and a part of a belt unit according to the second embodiment, as viewed from the sides of the photosensitive drums while the intermediate transfer belt is omitted.

A second embodiment will be described using FIG. 12 and FIG. 13, with reference to FIG. 3. In the first embodiment, the positioning of the primary transfer roller 6a is performed by the abutting of the butting part 25i on the restriction part 1i integrated with the photosensitive drum 1a. In contrast, in the embodiment, a restriction part 31d that abuts on the butting part 25i is provided on a rail 31A. The other constitutes and actions are the same as those in the first embodiment. Therefore, the same constitutes are denoted by the same reference characters, and the illustration and the description are omitted. Differences from the first embodiment will be mainly described below.

The rail 31A supports the frame 43 of the belt unit 10. The restriction part 31d as the first restriction unit is formed at each of both ends of the rail 31A in the longitudinal direction of the photosensitive drum 1a. The restriction part 31d can abut on the butting part 25i provided on the primary transfer holder 25a that holds the primary transfer roller 6a. The position of the restriction part 31d has been fixed at least at the time of image formation. Further, the restriction part 31d is formed such that the primary transfer roller 6a and the photosensitive drum 1a have the positional relation illustrated in FIG. 4 in a state where the restriction part 31d abuts on the butting part 25*i* that moves together with the primary transfer roller 6*a* biased by the pressurizing spring 28*a*.

In the embodiment, the positioning of the primary transfer roller 6*a* is performed by the butting of the butting part 25*i* against the restriction part 31*d*. The butting part 25*i* is formed integrally with the primary transfer holder 25*a* that holds the primary transfer roller 6*a*. The restriction part 31*d* is formed on the rail 31A. The rail 31A is positioned on the main body frame of the main body 100A. The photosensitive drum 1*a* is supported through the drum flange by the drum container that contains the photosensitive drum 1*a*. The drum container is supported by the main body frame. Accordingly, the positional accuracy of the primary transfer roller 6*a* and the photosensitive drum 1*a* is determined by seven components: the primary transfer roller 6*a*, the primary transfer holder 25*a* (the butting part 25*i*), the rail 31A (the restriction part 31*d*), the main body frame, the drum container, the drum flange and the photosensitive drum 1*a*. In the embodiment, the number of the components that determine the positional accuracy of the primary transfer roller 6*a* and the photosensitive drum 1*a* is more than that in the first embodiment. However, the embodiment can be effectively applied in the case where the restriction part 1*i* cannot be formed in the image forming part 3*a*, and the flexibility of the design is improved.

Third Embodiment

Figure 15A:
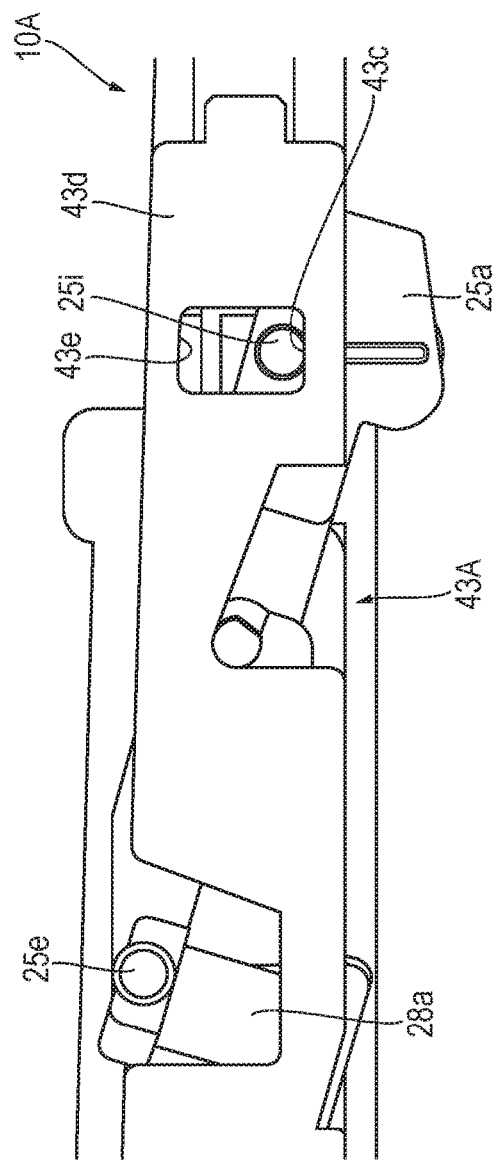
FIG. 15A is a lateral view of a part of the belt unit according to the third embodiment.
Figure 15B:
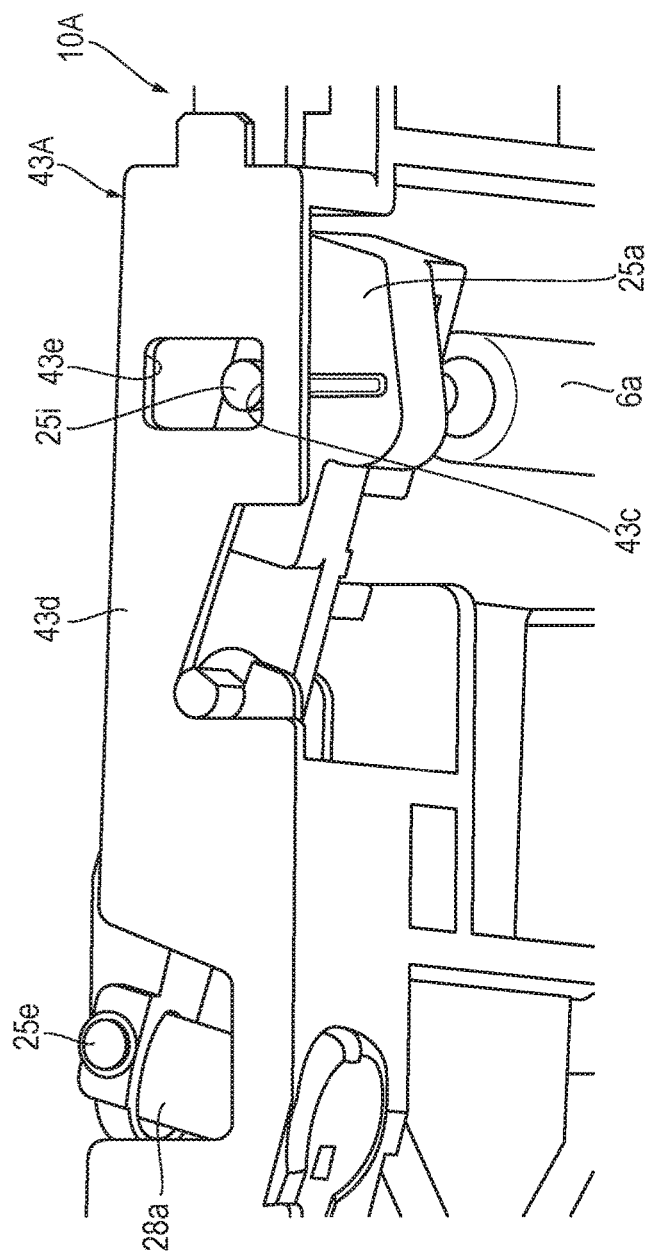
FIG. 15B is a perspective view of a part of the belt unit according to the third embodiment.

A third embodiment will be described using FIG. 14 and FIGS. 15A and 15B, with reference to FIG. 3. In the first embodiment, the positioning of the primary transfer roller 6*a* is performed by the abutting of the butting part 25*i* on the restriction part 1*i* integrated with the photosensitive drum 1*a*. In contrast, in the embodiment, a restriction part 43*c* that abuts on the butting part 25*i* is provided on a frame 43A. The other constitutes and actions are the same as those in the first embodiment. Therefore, the same constitutes are denoted by the same reference characters, and the illustration and the description are omitted. Differences from the first embodiment will be mainly described below.

The restriction part 43*c* as the first restriction unit is formed at each of both ends of the frame 43A of the belt unit 10A in the longitudinal direction of the photosensitive drum 1*a*. The restriction part 43*c* can abut on the butting part 25*i* provided on the primary transfer holder 25*a* that holds the primary transfer roller 6*a*. The restriction part 43*c* has been fixed at least at the time of image formation, and is a part of the rim of a through-hole 43*e* formed on a lateral plate 43*d* on each of both ends of the frame 43A in the longitudinal direction of the photosensitive drum 1*a*. The butting part 25*i* is disposed so as to enter the through-hole 43*e*, and moves in the through-hole 43*e*. Accordingly, the through-hole 43*e* has a size that enables the butting part 25*i* to move together with the primary transfer roller 6*a*. Further, the restriction part 43*c* is formed such that the primary transfer roller 6*a* and the photosensitive drum 1*a* have the positional relation illustrated in FIG. 4 in a state where the restriction part 43*c* abuts on the butting part 25*i* that moves together with the primary transfer roller 6*a* biased by the pressurizing spring 28*a*.

In the embodiment, the positioning of the primary transfer roller 6*a* is performed by the butting of the butting part 25*i* against the restriction part 43*c*. The butting part 25*i* is formed integrally with the primary transfer holder 25*a* that holds the primary transfer roller 6*a*. The restriction part 43*c* is formed on the frame 43A. The frame 43A is positioned on the main body frame of the main body 100A through the rail 31. The photosensitive drum 1*a* is supported through the drum flange by the drum container that contains the photosensitive drum 1*a*. The drum container is supported by the main body frame. Accordingly, the positional accuracy of the primary transfer roller 6*a* and the photosensitive drum 1*a* is determined by eight components: the primary transfer roller 6*a*, the primary transfer holder 25*a* (the butting part 25*i*), the frame 43A (the restriction part 43*c*), the rail 31, the main body frame, the drum container, the drum flange and the photosensitive drum 1*a*. In the embodiment, the number of the components that determine the positional accuracy of the primary transfer roller 6*a* and the photosensitive drum 1*a* is more than that in the first embodiment. However, the embodiment can be effectively applied in the case where the restriction part 1*i* cannot be formed in the image forming part 3*a*, and the flexibility of the design is improved. In the above description, the restriction part 43*c* is a part of the through-hole 43*e* formed on the frame 43A. However, another construction may be adopted. For example, a convex part may be provided on a part of the lateral plate 43*d* of the frame 43A, so as to abut on the butting part 25*i*.

Fourth Embodiment

Figure 16:
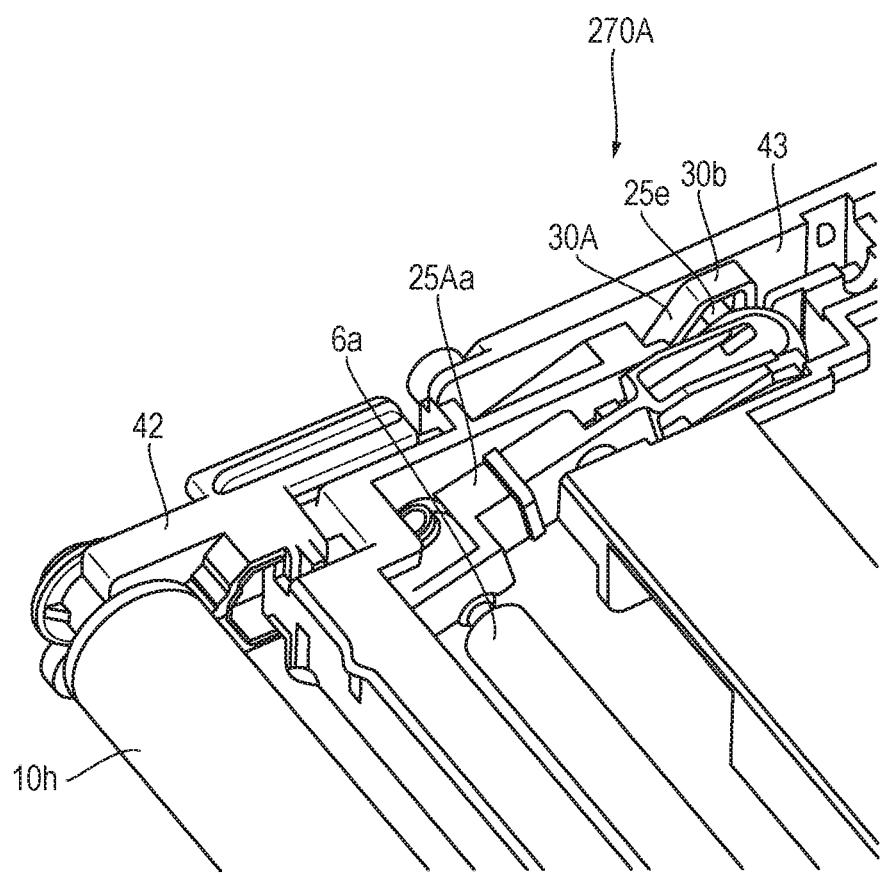
FIG. 16 is a perspective view of a part of a belt unit according to a fourth embodiment, as viewed from the opposite side of the photosensitive drums while the intermediate transfer belt is omitted.

A fourth embodiment will be described using FIG. 16, with reference to FIG. 3 and FIGS. 8A to 8C. In the first embodiment, the positioning of the primary transfer roller 6*a* is performed by the abutting of the butting part 25*i* on the restriction part 1*i* integrated with the photosensitive drum 1*a*. In contrast, in the embodiment, a projection part 25*e* provided on a primary transfer holder 25Aa serves also as the movement part, and the positioning of the primary transfer roller 6*a* is performed by the abutting of the projection part 25*e* on the restriction part 30*b* provided on a CL slider 30A (movement member). The other constitutes and actions are the same as those in the first embodiment. Therefore, the same constitutes are denoted by the same reference characters, and the illustration and the description are omitted. Differences from the first embodiment will be mainly described below.

Similarly to the first embodiment, a contacting mechanism 270A includes the Bk slider 29 and the CL slider 30A. By the contacting mechanism 270A, the intermediate transfer belt 10*e* abuts on or separates from the photosensitive drums 1*a* to 1*d*. However, in the CL slider 30A, unlike the CL slider 30 in the first embodiment, a restriction part 30*b* as the first restriction unit is provided on the end side of the slope part 29*a* that engages with the projection part 25*e* provided on the primary transfer holder 25*a*. That is, in the embodiment, the restriction part 30*b* is provided in the contacting mechanism 270A.

The position of the restriction part 30*b* has been fixed at least at the time of image formation. The restriction part 30*b* is provided at a position on which the projection part 25*e* as the movement part biased by the pressurizing spring 28*a* abuts when the CL slider 30A is at the position for the full color mode illustrated in FIG. 8A. Further, the restriction part 30*b* is formed such that the primary transfer roller 6*a* and the photosensitive drum 1*a* have the positional relation illustrated in FIG. 4 in a state where the projection part 25*e* abuts. The projection part 25*e* moves together with the primary transfer roller 6*a* biased by the pressurizing spring 28*a*.

In the embodiment, the positioning of the primary transfer roller 6*a* is performed by the butting of the projection part 25*e* against the restriction part 30*b*. The projection part 25*e* is formed integrally with the primary transfer holder 25*a* that holds the primary transfer roller 6a. The restriction part 30b is formed on the CL slider 30A. The CL slider 30A is provided on the frame 43. The frame 43 is supported by the rail 31 positioned on the main body frame of the main body 100A. The photosensitive drum 1a is supported by the drum container that contains the photosensitive drum 1a. The drum container is supported by the main body frame. Accordingly, the positional accuracy of the primary transfer roller 6a and the photosensitive drum 1a is determined by nine components described below. That is, the positional accuracy is determined by nine components: the primary transfer roller 6a, the primary transfer holder 25a (the projection part 25e), the CL slider 30A (the restriction part 30b), the frame 43, the rail 31A, the main body frame, the drum container, the drum flange and the photosensitive drum 1a. In the embodiment, the number of the components that determine the positional accuracy of the primary transfer roller 6a and the photosensitive drum 1a is more than that in the first embodiment. However, the positioning of the primary transfer roller 6a can be performed in the belt unit, and therefore, the flexibility of the design is improved.

Fifth Embodiment

Figure 17:
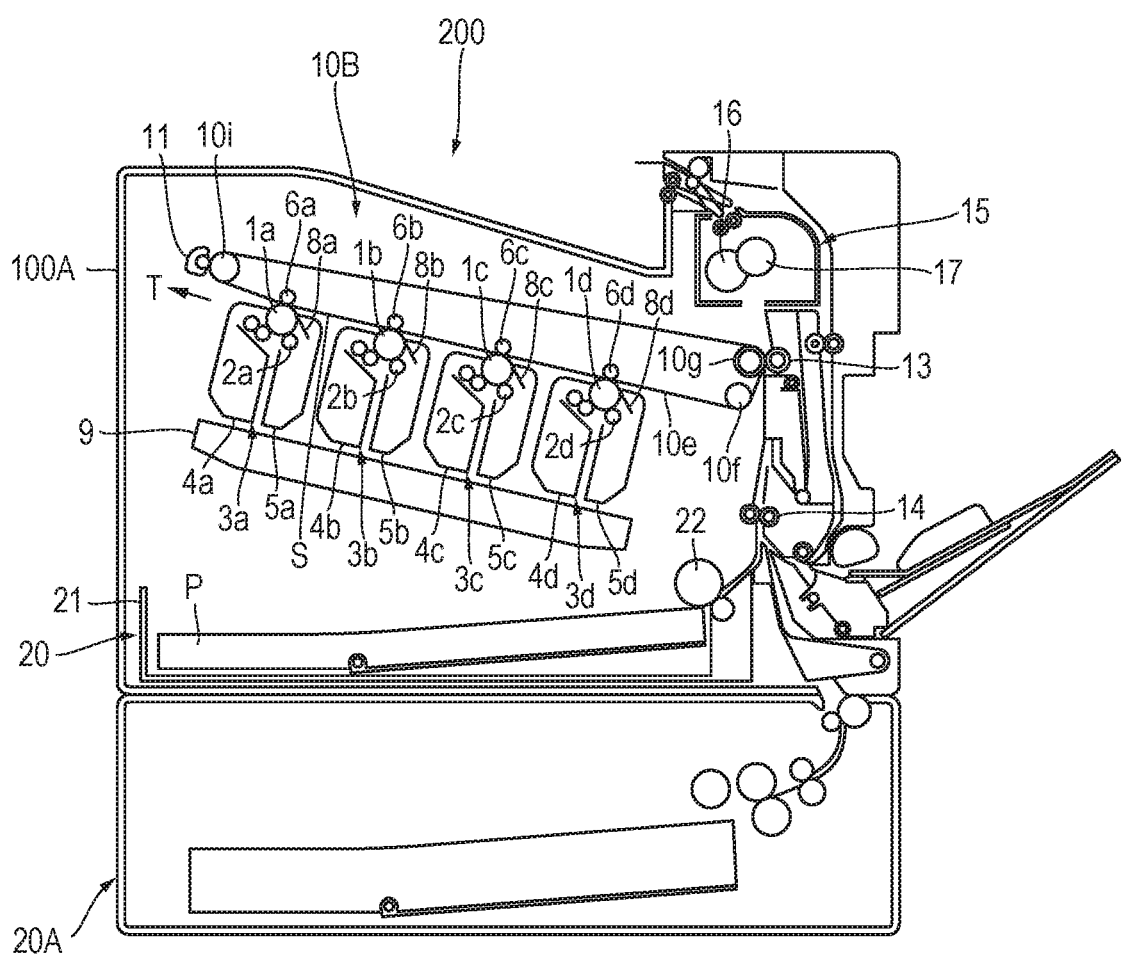
FIG. 17 is a schematic construction cross-section view of an image forming apparatus according to a fifth embodiment.

A fifth embodiment will be described using FIG. 17. In the above-described embodiment, the construction in which the tension roller 10h is disposed on the upstream side of the primary transfer roller 6a has been described. In contrast, in an image forming apparatus 200 in the embodiment, a steering roller 10i that controls the deviation of the intermediate transfer belt 10e in the width direction is disposed instead of the tension roller 10h. The other constitutes and actions are the same as those in the first embodiment. Therefore, the same constitutes are denoted by the same reference characters, and the illustration and the description are omitted. Differences from the first embodiment will be mainly described below.

The steering roller 10i is disposed upstream from the primary transfer roller 6a in the rotation direction of the primary transfer roller 6a. The primary transfer roller 6a is disposed on the most upstream side in the rotation direction of the intermediate transfer belt 10e, on the predetermined looped surface S. The steering roller 10i is rotatably supported by bearings, at both ends in the longitudinal direction (rotation axis direction) of the steering roller 10i. Each bearing on both sides of the steering roller 10i is provided on a rocking member that is supported by the frame of a belt unit 10B so as to be rockable about the central position of the steering roller 10i in the longitudinal direction. Therefore, the steering roller 10i is rockably supported by the frame. The rocking direction is a direction roughly orthogonal to the looped surface of the intermediate transfer belt 10e looped by the drive roller 10g and the steering roller 10i (a roughly top-bottom direction in FIG. 17).

When the intermediate transfer belt 10e deviates to one side in the width direction crossing the rotation direction, the steering roller 10i acts to incline (to perform self-aligning) and eliminate the deviation of the intermediate transfer belt 10e (deviation control).

The steering roller 10i is disposed such that a part on the outer circumferential surface of the intermediate transfer belt 10e that is looped around the steering roller 10i is more distant from the photosensitive drums 1a to 1d in the direction orthogonal to the predetermined looped surface S than the predetermined looped surface S is. That is, the intermediate transfer belt 10e is looped around the primary transfer roller 6a such that the predetermined looped surface S is formed. Further, as illustrated in FIG. 17, a part on the upstream side of the part of the intermediate transfer belt 10e that is looped around the primary transfer roller 6a is looped around the steering roller 10i, above the predetermined looped surface S.

In the embodiment also, the positioning of the primary transfer roller 6a and the driven roller 10f is performed by the abutting restriction. Therefore, the predetermined looped surface S can be stably formed by the primary transfer roller 6a, without being influenced by the operation of the steering roller 10i on the upstream side. Instead of the construction of self-aligning, the steering roller 10i may be adapted to rock when a driving apparatus such as a motor moves one end or both ends of the steering roller 10i. The construction in the embodiment may be applied to the second to fourth embodiments.

Sixth Embodiment

Figure 18:
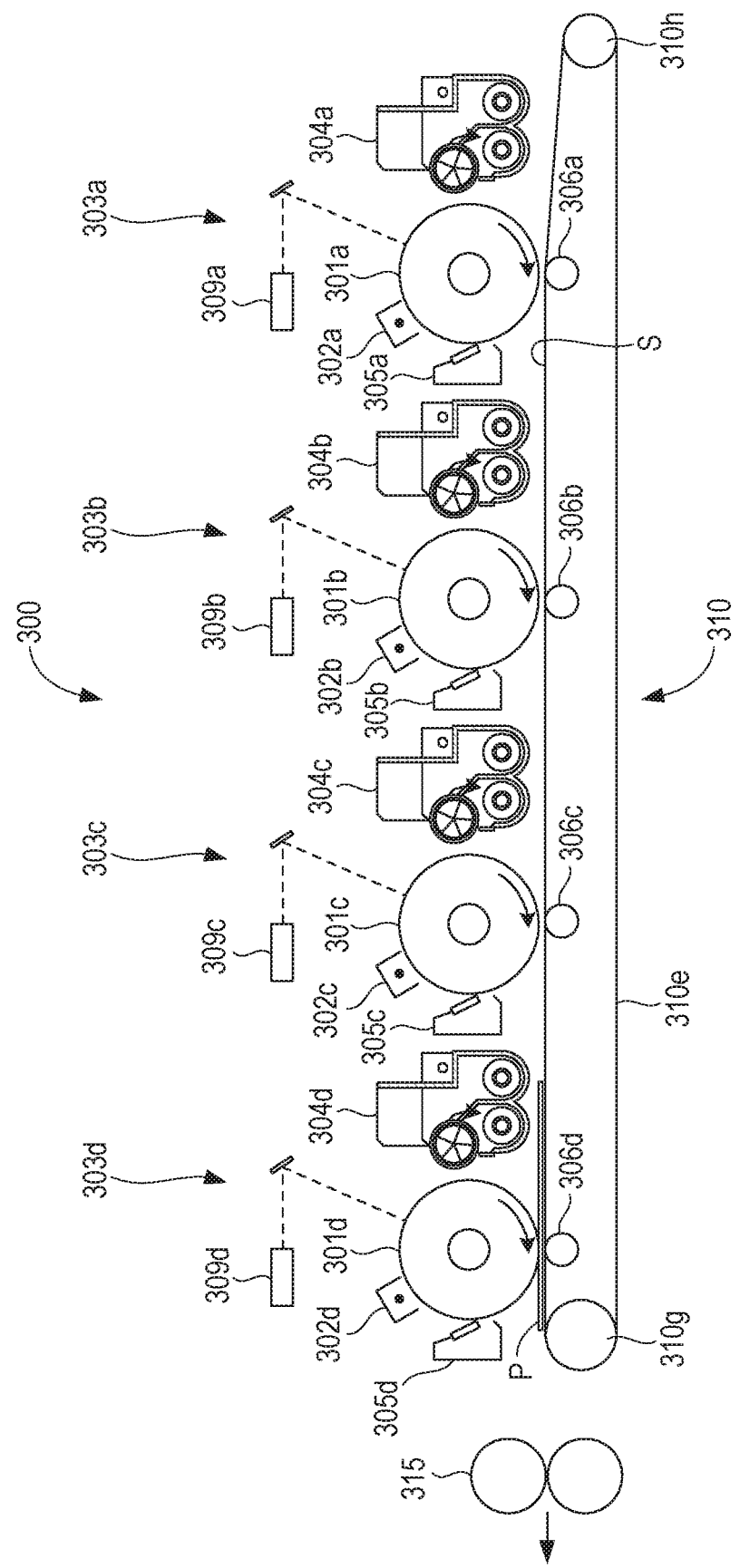
FIG. 18 is a schematic construction cross-section view of an image forming apparatus according to a sixth embodiment.

A sixth embodiment will be described using FIG. 18. In the above-described embodiments, the intermediate transfer process using the intermediate transfer belt as the belt has been described. In contrast, in the embodiment, a recording material conveyance belt 310e is used as the belt. The recording material conveyance belt 310e conveys the recording material, and photosensitive drums 301a to 301d directly transfer toner images to the conveyed recording material. That is, in the embodiment, the present invention is applied to a direct transfer process in which toner images are directly transferred from the photosensitive drums to the recording material. The construction is basically the same as that in the first embodiment, except that an image forming apparatus 300 adopts the direct transfer process. Therefore, the same construction will be briefly described. Difference from the first embodiment will be mainly described below.

The image forming apparatus 300 in the embodiment includes a first image forming part 303a, a second image forming part 303b, a third image forming part 303c, a fourth image forming part 303d, as a plurality of image forming parts. The image forming parts 303a, 303b, 303c, 303d form images for yellow (Y), magenta (M), cyan (C) and black (K), respectively.

The constructions and operations of the image forming parts 303a, 303b, 303c, 303d are substantially the same, except the color of the toner to be used. Accordingly, the image forming part 303a will be representatively described. The constructions of the other image forming parts are shown by replacing the suffix a put to the reference numeral with suffixes b, c, d, and the descriptions are omitted.

The image forming part 303a includes a photosensitive drum 301a that is a drum type (cylindrical) electrophotographic photosensitive member (photosensitive member), as an image bearing member. In the embodiment, the photosensitive drum 301a corresponds to the first image bearing member, and the photosensitive drums 301b to 301d correspond to the second image bearing member. The photosensitive drum 301a is driven to rotate in a clockwise direction in FIG. 18. Around the photosensitive drum 301a, a charging roller 302a as a charging unit, an exposure device 309a as an exposure unit, a developing device 304a as a developing unit, and a drum cleaning device 305a as a clean-up unit are disposed. Furthermore, a belt unit 310 is disposed below the photosensitive drums 301a, 301b, 301c, 301d.

The belt unit 310 includes the recording material conveyance belt 310e that is an endless belt, such that the recording material conveyance belt 310e faces the photosensitive drums 301a, 301b, 301c, 301d as the plurality of image bearing members. The recording material conveyance belt 310e is looped around a drive roller 310g and a tension roller 310h as a plurality of support rollers. The recording material conveyance belt 310e rotates in a counterclockwise direction in FIG. 18 (circling movement), when the drive roller 310g is driven to rotate.

The tension roller 310h is disposed such that a part on the outer circumferential surface of the recording material conveyance belt 310e that is looped around the tension roller 310h is more distant from the photosensitive drums 301a to 301d in the direction orthogonal to a predetermined looped surface S than the predetermined looped surface S is. The predetermined looped surface S is formed from the transfer roller 306a to the drive roller 310g in the rotation direction of the recording material conveyance belt 301e. The tension roller 310h may serve also as a steering roller.

On the inner circumferential surface side of the recording material conveyance belt 310e, transfer rollers 306a, 306b, 306c, 306d as a plurality of transfer rollers are disposed at positions respectively corresponding to the photosensitive drums 301a, 301b, 301c, 301d. The transfer rollers 306a, 306b, 306c, 306d are respectively biased (pressed) at a predetermined pressure toward the photosensitive drums 301a, 301b, 301c, 301d through the recording material conveyance belt 310e.

At the time of image formation, similarly to the description in the first embodiment, toner images are formed on the surfaces of the photosensitive drums 301a, 301b, 301c, 301d. The toner images for the respective colors are transferred such that the toner images are sequentially superimposed to the recording material P conveyed while being born on the recording material conveyance belt 310e (on the belt). The recording material P after the toner images are transferred is conveyed to a fixing device 315, and is heated and pressurized. Thereby, the toner image is fixed on the surface of the recording material.

In the embodiment, each of the transfer rollers 306a, 306b, 306c, 306d is a metal roller, similarly to the primary transfer rollers 6a to 6d in the first embodiment. Further, the transfer rollers 306a, 306b, 306c, 306d are disposed so as to be offset from the photosensitive drums 301a, 301b, 301c, 301d to the downstream side in the rotation direction of the recording material conveyance belt 310e. Thereby, the transfer rollers 306a to 306d are respectively disposed such that the gaps from the corresponding photosensitive drums 301a to 301d are larger than the thickness of the recording material conveyance belt 310e. Further, by utilizing the elasticity of the recording material conveyance belt 310e, it is possible to prevent the transfer rollers 306a to 306d from damaging the photosensitive drums 301a to 301d.

The positioning of the transfer roller 306a that is a first transfer roller is determined similarly to the primary transfer roller 6a in the first embodiment. That is, the positioning of the transfer roller 306a is performed by the abutting of a butting part (which is the same as the butting part 25i in FIG. 11) on a restriction part (which is the same as the restriction part 1i in FIG. 11). The position of the restriction part has been fixed at least at the time of image formation. The positioning construction of the transfer roller 306a may be the same as the positioning construction of the primary transfer roller 6a in any of the second to fourth embodiment.

The positioning of the drive roller 310g that is a support roller is performed similarly to the driven roller 10f in the first embodiment. That is, the positioning of the drive roller 310g is performed by the abutting of a roller bearing member (which is the same as the driven roller bearing member 40 in FIGS. 8A to 8C) on a butting part (which is the same as the butting part 29b in FIGS. 8A to 8C). The position of the butting part is fixed at least at the time of image formation.

The positioning of the transfer rollers 306b to 306d that are second transfer rollers is performed similarly to the primary transfer rollers 6b to 6d in the first embodiment. That is, each position of the transfer rollers 306b to 306d is set to a balanced position between the tensile force of the recording material conveyance belt 310e and the biasing force of a pressurizing spring (the pressurizing springs 28b to 28d in FIG. 3).

In the embodiment, the transfer roller 306a is the upstream support roller of the upstream and downstream support rollers that form the predetermined looped surface S on the recording material conveyance belt 310e. In other words, the transfer roller 306a serves also as the upstream support roller. Therefore, the cross-section of the belt unit 310 can be reduced, resulting in the miniaturization of the apparatus. Thereby, the circumferential length of the recording material conveyance belt 310e can be reduced. Further, one support roller can be reduced, resulting in cost reduction.

The positioning of the transfer roller 306a is performed by the abutting between the butting part to move together with the transfer roller 306a and the restriction part (that is, by the abutting restriction). Thereby, the predetermined looped surface S can be stably formed regardless of the change in the tensile force of the recording material conveyance belt 310e.

Other Embodiment

In the above-described embodiments, the intermediate transfer belt 10e is looped around the primary transfer roller 6a and the other three rollers. However, in the present invention, the number of the support rollers is not limited to this, and may be equal to or greater than this. Further, the outer diameter and positional relation of the primary transfer roller can be changed depending on use condition.

In the above-described embodiments, the image forming apparatus is a printer. However, other than the printer, the image forming apparatus may be one of a copying machine, a facsimile and a multifunction peripheral that has a plurality of functions of the functions of the printer, the copying machine and the facsimile.

According to the present invention, a predetermined looped surface can be stably formed, and the miniaturization of the apparatus can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-139450, filed Jul. 18, 2017, which is hereby incorporated by reference herein in its entirety.

What is claimed is:

1. An image forming apparatus comprising:
   a first image bearing member configured to bear a toner image;
   a second image bearing member configured to bear a toner image;
   an endless belt that is rotatably provided and configured to contact the first image bearing member at a first contact position where the toner image is transferred from the first image bearing member and to contact the second image bearing member at a second contact position where the toner image is transferred from the second image bearing member, the second contact position being disposed, with respect to a rotation direction of the belt, downstream of the first contact position and upstream of a secondary transfer position where the toner images transferred from the first and second image bearing members are transferred to a recording material;

a first transfer member configured to transfer the toner image from the first image bearing member to the belt by being applied with a voltage and to contact with an inner circumferential surface of the belt at a first transfer position offset from first contact position with respect to the rotation direction of the belt;

a second transfer member configured to transfer the toner image from the second image bearing member to the belt by being applied with a voltage and to contact with the inner circumferential surface of the belt at a second transfer position offset from the second contact position with respect to the rotation direction of the belt;

a first movement portion that supports the first transfer member and is configured to move the first transfer member, the first movement portion being movable in a first direction in which the first transfer member abuts on and separates from the belt;

a second movement portion that supports the second transfer member and is configured to move the second transfer member, the second movement portion being movable in a second direction in which the second transfer member abuts on and separates from the belt;

a first biasing member configured to bias the first movement portion toward the belt so as to contact the first transfer member with the belt;

a second biasing member configured to bias the second movement portion toward the belt so as to contact the second transfer member with the belt; and a positioning member configured to abut on the first movement portion when the first transfer member abuts on the belt and to position the first transfer member in the first direction, wherein when the second transfer member abuts on the belt, the second transfer member is supported at a position balanced with a force received by the belt, and when the second transfer member abuts on the belt, no member is provided to abut on the second movement portion and to position the second movement portion in the second direction.

2. The image forming apparatus according to claim 1, further comprising an upstream support member configured to support the belt and contact with the inner circumferential surface of the belt at an upstream contact position, the upstream contact position being disposed adjacent to and upstream of the first transfer position with respect to the rotation direction of the belt, wherein at the time of image formation in which the first image bearing member and the second image bearing member are brought into contact with the belt to form the image, the upstream support member is disposed at a position away from an external tangent, from among external common tangents of the first image bearing member and the second image bearing member and that is disposed on the belt side, to a side opposite to the first image bearing member as viewed from a rotation axis direction of the upstream support member.

3. The image forming apparatus according to claim 2, further comprising a secondary transfer member that transfers the toner images from the belt to the recording material, the secondary transfer member being disposed upstream of the upstream support member and downstream of the second contact position with respect to the rotation direction of the belt.

4. The image forming apparatus according to claim 1, wherein the first transfer member and the second transfer member are metal rollers.

5. The image forming apparatus according to claim 2, wherein the upstream support member is a tension roller that gives a tensile force to the belt.

6. The image forming apparatus according to claim 2, wherein the upstream support member is supported so as to be able to pivot around a rocking axis crossing the rotation axis direction of the upstream support member.

7. The image forming apparatus according to claim 1, further comprising a first slider configured to move the first movement portion, wherein the positioning member is provided on the first slider.

8. The image forming apparatus according to claim 1, further comprising:

a slider configured to move the first movement portion; and a frame that moveably supports the slider, wherein the positioning member is provided on the frame.

9. The image forming apparatus according to claim 1, further comprising a drum unit that includes the first image bearing member, wherein the positioning member is provided on the drum unit.

10. The image forming apparatus according to claim 1, wherein the first image bearing member bears a toner image for yellow.

11. The image forming apparatus according to claim 2, further comprising a cleaning device that removes remaining toner on the belt, wherein the cleaning device is supported by the upstream support member.

12. The image forming apparatus according to claim 1, further comprising a plurality of image bearing members including the first image bearing member and the second image bearing member, the first image bearing member being disposed on a most upstream side of the belt with respect to the rotation direction of the belt and the second image bearing member being disposed on a most downstream side of the belt with respect to the rotation direction of the belt.

13. The image forming apparatus according to claim 1, wherein the first biasing member has a higher biasing force than the second biasing member.

14. The image forming apparatus according to claim 1, further comprising:

a downstream support member configured to support the belt and contact with the inner circumferential surface of the belt at a downstream contact position, the downstream contact position being disposed adjacent to and downstream of the second transfer position with respect to the rotation direction of the belt;

a third movement portion that supports the downstream support member and is configured to move the downstream support member; and a second positioning member configured to position the third movement portion, wherein the third movement portion is biased toward the second positioning member when the first and second transfer members contact with the belt.

15. The image forming apparatus according to claim 1, wherein the first transfer position is downstream of a downstream end of the first contact position and upstream of the second contact position with respect to the rotation direction of the belt, and the second transfer position is downstream of a downstream end of the second contact position and upstream of the secondary transfer position with respect to the rotation direction of the belt.

16. An image forming apparatus comprising:
- a first image bearing member configured to bear a toner image;
- a second image bearing member configured to bear a toner image;
- an endless belt that is rotatably provided and configured to contact the first image bearing member at a first contact position where the toner image is transferred from the first image bearing member and to contact the second image bearing member at a second contact position where the toner image is transferred from the second image bearing member, the second contact position being disposed, with respect to a rotation direction of the belt, downstream of the first contact position and upstream of a secondary transfer position where the toner images transferred from the image bearing members are transferred to a recording material;
- a first transfer member configured to transfer the toner image from the first image bearing member to the belt by being applied with a voltage and to contact with an inner circumferential surface of the belt at a first transfer position offset from the first contact position with respect to the rotation direction of the belt;
- a second transfer member configured to transfer the toner image from the second image bearing member to the belt by being applied with a voltage and to contact with the inner circumferential surface of the belt at a second transfer position offset from the second contact position with respect to the rotation direction of the belt;
- a first movement portion that supports the first transfer member and is configured to move the first transfer member, the first movement portion being movable in a first direction in which the first transfer member abuts on and separates from the belt;
- a second movement portion that supports the second transfer member and is configured to move the second transfer member, the second movement portion being movable in a second direction in which the second transfer member abuts on and separates from the belt;
- a first biasing member configured to bias the first movement portion toward the belt so as to contact the first transfer member with the belt;
- a second biasing member configured to bias the second movement portion toward the belt so as to contact the second transfer member with the belt; and
- a positioning member configured to abut on the first movement portion and position the first transfer member in the first direction,
- wherein when the first transfer member and the second transfer member are abutting on the belt, the first transfer member is restricted by an abutting restriction of the positioning member, and the second transfer member is restricted by pressure restriction of the belt.

* * * * *